(12) United States Patent
Beiler et al.

(10) Patent No.: US 12,595,007 B2
(45) Date of Patent: Apr. 7, 2026

(54) LOCKING MECHANISM FOR SELF-PROPELLED TANDEM AXLE TRAILER

(71) Applicant: New Heights, LLC, Leola, PA (US)

(72) Inventors: Aaron Jay Beiler, Gap, PA (US); Raymond Beiler, New Holland, PA (US); Josiah Harthcock, Lancaster, PA (US); Jeremiah Weaver, Narvon, PA (US)

(73) Assignee: New Heights, LLC, Leola, PA (US)

( * ) Notice: Subject to any disclaimer, the term of this patent is extended or adjusted under 35 U.S.C. 154(b) by 515 days.

(21) Appl. No.: 18/312,953

(22) Filed: May 5, 2023

(65) Prior Publication Data

US 2024/0367736 A1    Nov. 7, 2024

(51) Int. Cl.
| | |
|---|---|
| *B62D 59/04* | (2006.01) |
| *B60K 7/00* | (2006.01) |
| *B60K 17/02* | (2006.01) |
| *B60K 17/04* | (2006.01) |
| *F16D 11/14* | (2006.01) |
| *F16D 25/061* | (2006.01) |
| *F16D 1/10* | (2006.01) |
| *F16D 11/00* | (2006.01) |

(52) U.S. Cl.
CPC ............ *B62D 59/04* (2013.01); *B60K 7/0015* (2013.01); *B60K 17/02* (2013.01); *B60K 17/043* (2013.01); *F16D 11/14* (2013.01); *F16D 25/061* (2013.01); *F16D 1/10* (2013.01); *F16D 2001/103* (2013.01); *F16D 2011/006* (2013.01)

(58) Field of Classification Search
CPC ...... B62D 59/04; B60K 7/0015; B60K 17/02; B60K 17/043; F16D 11/14; F16D 25/061; F16D 1/10; F16D 2001/103; F16D 2011/006
USPC .......................................................... 180/62
See application file for complete search history.

(56) References Cited

U.S. PATENT DOCUMENTS

| | | | | |
|---|---|---|---|---|
| 9,562,574 | B2 * | 2/2017 | Kimes | F16D 41/04 |
| 11,530,008 | B2 * | 12/2022 | Beiler | B62D 63/06 |
| 11,794,831 | B2 * | 10/2023 | Beiler | B60K 17/30 |
| 11,840,292 | B2 * | 12/2023 | Beiler | B62D 59/04 |
| 11,866,910 | B2 * | 1/2024 | Fliearman | F16H 3/66 |
| 2016/0201740 | A1 * | 7/2016 | Kimes | F16D 41/14 |
| | | | | 192/46 |
| 2021/0001937 | A1 * | 1/2021 | Beiler | B60G 3/12 |
| 2021/0001938 | A1 * | 1/2021 | Beiler | B60P 1/44 |
| 2021/0001939 | A1 * | 1/2021 | Beiler | B62D 63/08 |
| 2021/0122331 | A1 * | 4/2021 | Taljaard | B60R 25/06 |

* cited by examiner

*Primary Examiner* — James A Shriver, II
*Assistant Examiner* — Hilary L Johns
(74) *Attorney, Agent, or Firm* — Barley Snyder

(57) ABSTRACT

A trailer for towing by a power vehicle is provided and generally includes a frame and a tandem wheel assembly. The trailer is provided with a drive assembly having a locking assembly to selectively engage the drive from the motor to the wheels of the trailer. The locking mechanism having a pushing member, and an urging member carrying a plurality of biasing devices and plungers inserted into radially arranged openings in the urging member, such that the plungers are biased against a bearing surface of the driveshaft to urge the driveshaft to shift in a direction, when the clutch assembly allows the driveshaft to shift laterally.

20 Claims, 32 Drawing Sheets

A

LOCKING MECHANISM FOR SELF-PROPELLED TANDEM AXLE TRAILER

FIELD OF THE INVENTION

The invention relates to a selectively engageable drive mechanism having a locking assembly for safely isolating motive power from a motor to a drive wheel. Such a selectively engageable drive mechanism can be deployed, for example, on a self-propelled trailer, or a conveyor assembly. The selectively engageable drive mechanism embodiments described herein provide a locking assembly that urges engagement and disengagement of a clutch assembly, but the urging is effective only when proper conditions are present in the clutch assembly to allow a safe release or engagement of the clutch assembly.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the building and then workers manually pick up debris to deposit it into a disposal container. Even if the material can be thrown directly into a container there remain the problems of getting the disposal container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

Such a vehicle would have to negotiate varying terrain and move in a self-propelled manner, but also be capable of being towed to a work site, such as by a tow truck, and would have to be capable of safely converting between self-propelled mode and towed mode, even while on varying terrain.

There is a need for a vehicle that can move around the typical landscaped yard surrounding a building and position a storage bin into an extended position near workers and that is study enough to handle large loads, and can be safely transitioned in and out of operating under self-propelled mode.

SUMMARY

In view of the foregoing, a selectively engageable drive system is provided that can be used in any variety of drive mechanism embodiments, for example, as can be deployed on a trailer suitable for towing by a power vehicle with the drive system disengaged, but can be converted to operate in self-propelled manner with the drive system engaged.

In an exemplary embodiment, there may be provided a selectively engageable drive system having a driveshaft, a clutch assembly, and a locking mechanism for selectively engaging the drive assembly, where the locking mechanism includes: a pushing member configured to reciprocate between a first position and second position within a housing; an urging member in mechanical engagement with the pushing member, the urging member providing a collar with a plurality of radially oriented recesses, a plurality of plungers, and a plurality of biasing devices, with each recess of the plurality of recesses receiving one biasing device of the plurality of biasing devices, and one plunger of the plurality of plungers; the plurality of plungers being oriented to be urged against a portion of a drive shaft that is configured to be shifted laterally in a first direction in an amount for effecting engagement of the clutch assembly, and shifted laterally in a second direction in an amount for effecting the disengagement of the clutch assembly, the drive shaft further having an annular protrusion providing a first bearing surface and a second bearing surface positioned on either side of an apex of the protrusion.

In an exemplary embodiment, the lateral shifting of the drive shaft may be urged in the first direction by the positioning of the urging member such that the plurality of plungers are pressed against the first bearing surface of the pair of bearing surfaces, and the lateral shifting of the drive shaft may be urged in the second direction by the positioning of the urging member such that the plurality of plungers are pressed against the second bearing surface of the pair of bearing surfaces.

In an embodiment, the clutch assembly providing a driving clutch element mechanically fixed to the driveshaft, and a driven clutch element mechanically fixed to a wheel hub, the engagement of the clutch assembly may provide for powering the rotation of a wheel through the drive assembly by moving the driving clutch element into rotational interference with the driven clutch element. In an embodiment, the drive assembly may further comprise a motive power source, and the drive shaft may have a power input end that engages the motive power source through a connection capable of lateral movement, and an output end that is mechanically fixed to the driving clutch element. In an exemplary embodiment, the power input end may have a splined connection that allows lateral movement of the driveshaft relative to the motive power source, and where the power input end does not rotate independently of the motive power source mated to the splined connection. In an embodiment, the driving clutch element and the driven clutch element each provide a plurality of teeth having engaging side surfaces, and each tooth of the plurality of teeth has planar engagement side surfaces. In an embodiment, each tooth when viewed along a radial axis of the clutch assembly may have a dovetail profile, characterized by the base of each tooth being of narrow dimension that the top plane extended between the upper edge of the side surfaces of each tooth.

In an exemplary embodiment, the urging of the drive shaft in the first direction by the urging member may not be effective in laterally shifting the driveshaft until such a point as the clutch assembly is capable of being engaged. In an embodiment, the urging of the drive shaft in the second direction by the urging member may not be effective in laterally shifting the driveshaft until such a point as the clutch assembly is capable of being disengaged. In an embodiment, the clutch assembly being capable of being engaged is a temporary status of the clutch assembly characterized by the teeth of the driving clutch element and driven clutch element being rotated into non-overlapping alignment, when viewed in an axial direction. In an embodiment, the clutch assembly being capable of being disengaged is a temporary status of the clutch assembly characterized by there being an absence of torque being transmitted through the clutch assembly of the driveline.

In an exemplary embodiment, the reciprocating movement of the pushing member is caused by rotation of a spindle in mechanical engagement with the pushing member, the spindle having a pin mounted off center at the end of the spindle and extending into a slot of the pushing member.

In an exemplary embodiment, the reciprocating movement of the pushing member is directed by manipulating pressures in a first and second chamber alongside the pushing member, the pushing member having a medial seal that separates the first chamber from the second chamber. In an embodiment, the reciprocating movement of the pushing member is hydraulically actuated, and the first chamber is in fluid communication with a first hydraulic port, and the second chamber is in fluid communication with a second hydraulic port. In an embodiment, the locking mechanism further comprises a retainer provided to retain the pushing member and urging member within the housing.

In an exemplary embodiment, the plungers have a leading end with a friction reducing property.

In an embodiment, the source of motive power is a hydraulic motor, and a transmission is provided between the motor and the driveshaft, and the driveshaft is slidably extended between the transmission and the clutch assembly.

In an exemplary embodiment, there is provided a self-propelled vehicle having: a frame forming an undercarriage chassis; a wheel assembly positioned under the undercarriage chassis and comprising a hub assembly, a drive assembly including a hub, motor, a transmission, a selectively engageable clutch, a driveshaft with an annular protrusion providing a pair of bearing surfaces on either side of an apex of the protrusion, and a locking mechanism having a pushing member, an urging member with a plurality of plungers protruding inwards from the urging member and against the annular protrusion of the driveshaft, wherein the urging on the driveshaft is not effective until the clutch assembly allows the urging to become effective.

In an embodiment, the urging member may be mechanically secured to the pushing member, the urging member having a collar with a plurality of radially oriented recesses, each recess of the plurality of recesses receiving therein a biasing device and one plunger of the plurality of plungers. In an embodiment, the plurality of plungers are pressed against a bearing surface of the pair of bearing surfaces to urge the driveshaft to shift laterally in a first direction.

BRIEF DESCRIPTION OF THE DRAWINGS

The invention is explained in greater detail below with reference to embodiments and the appended drawings of which:

FIG. 34 is a partial cross-section view of the rear drive assembly of the embodiment of the selectively engageable drive system for self-propelled trailer of FIG. 27, with the section view taken along the line 34-34 of FIG. 31;

DETAILED DESCRIPTION OF THE EMBODIMENT(S)

Figure 27:
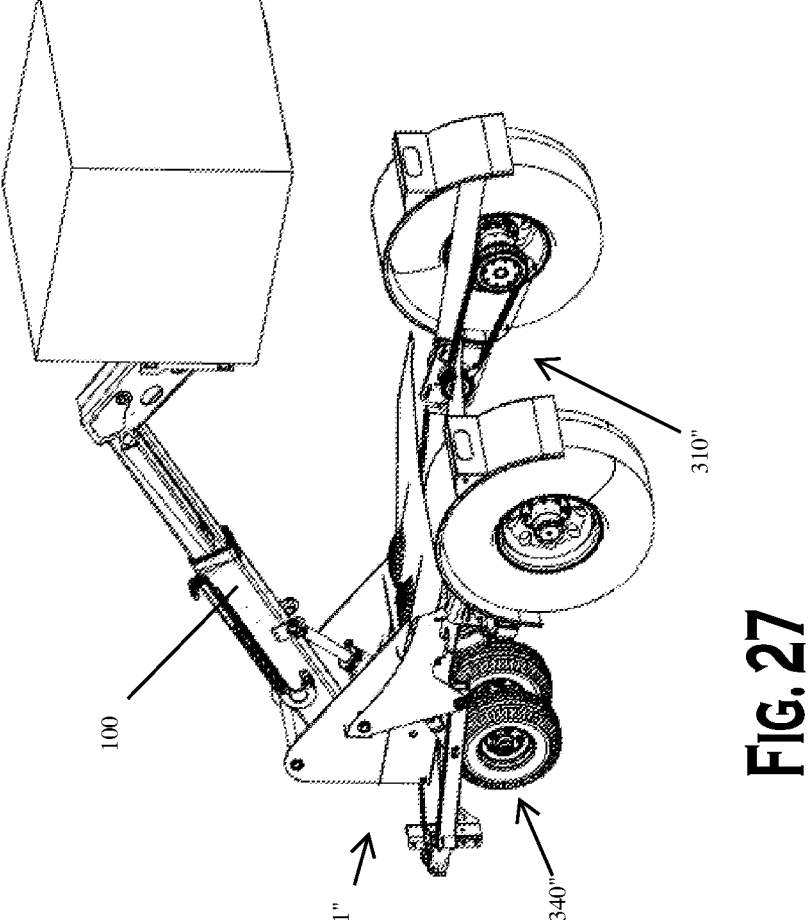
FIG. 27 is a rear ¾ perspective view of an alternative embodiment of a self-propelled trailer having an alternative wheel assembly and driveline configuration, and having another embodiment of the selectively engageable drive system according to an embodiment of the invention, with the belt guard removed to show details of the driveline.
Figure 28:
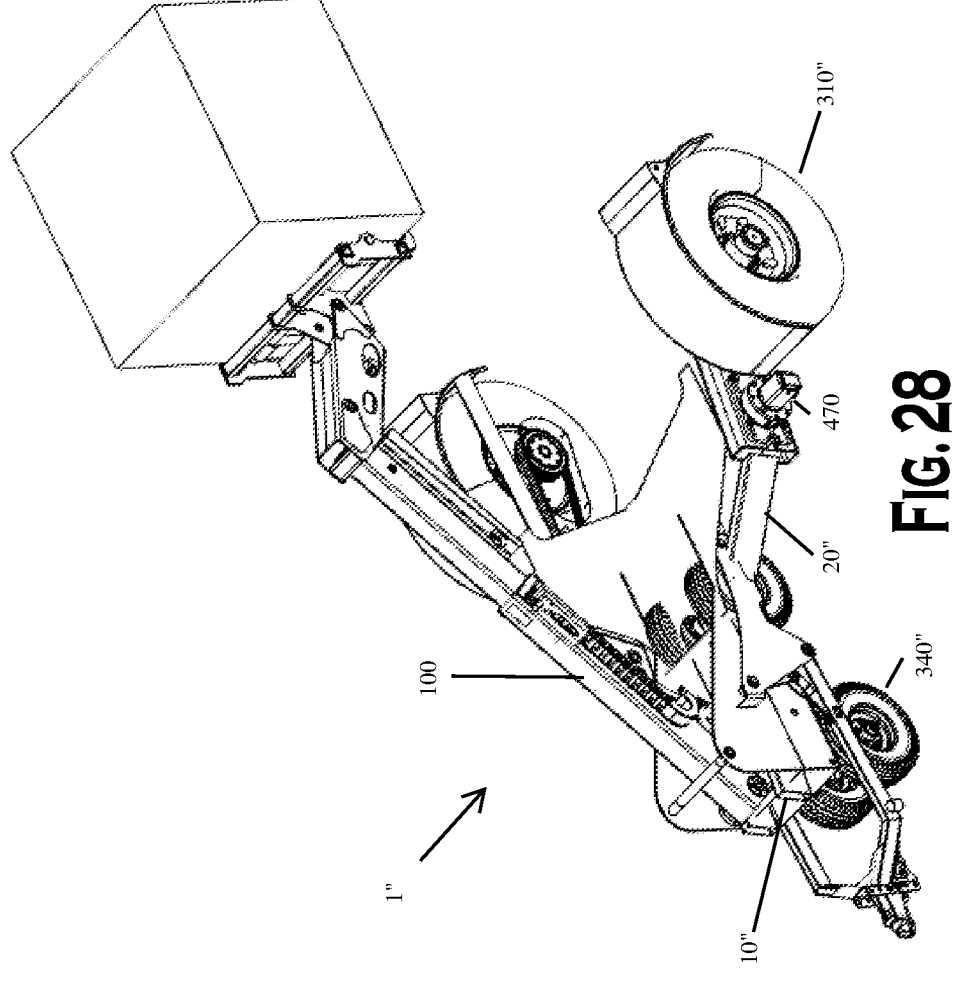
FIG. 28 is an elevated perspective view of the embodiment of the self-propelled trailer of FIG. 27.
Figure 29:
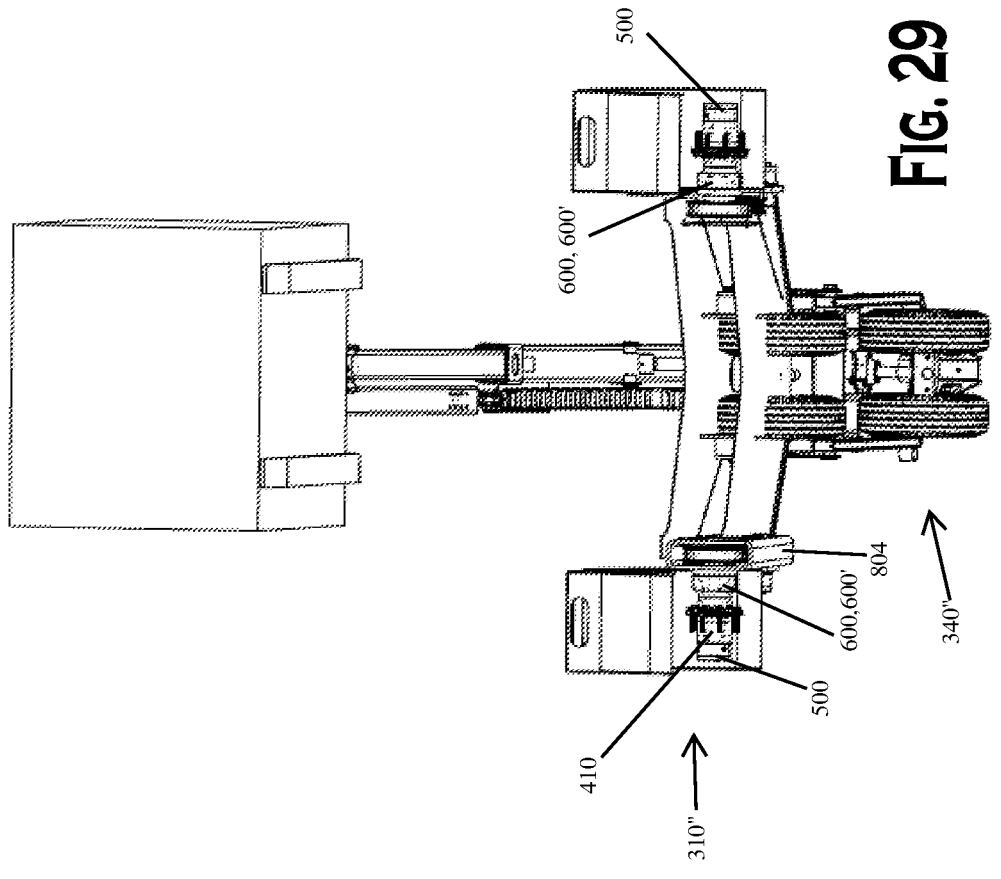
FIG. 29 is a rear bottom perspective view of the embodiment of the self-propelled trailer of FIG. 27, with the rear wheels removed in order to depict the wheel assemblies.
Figure 30:
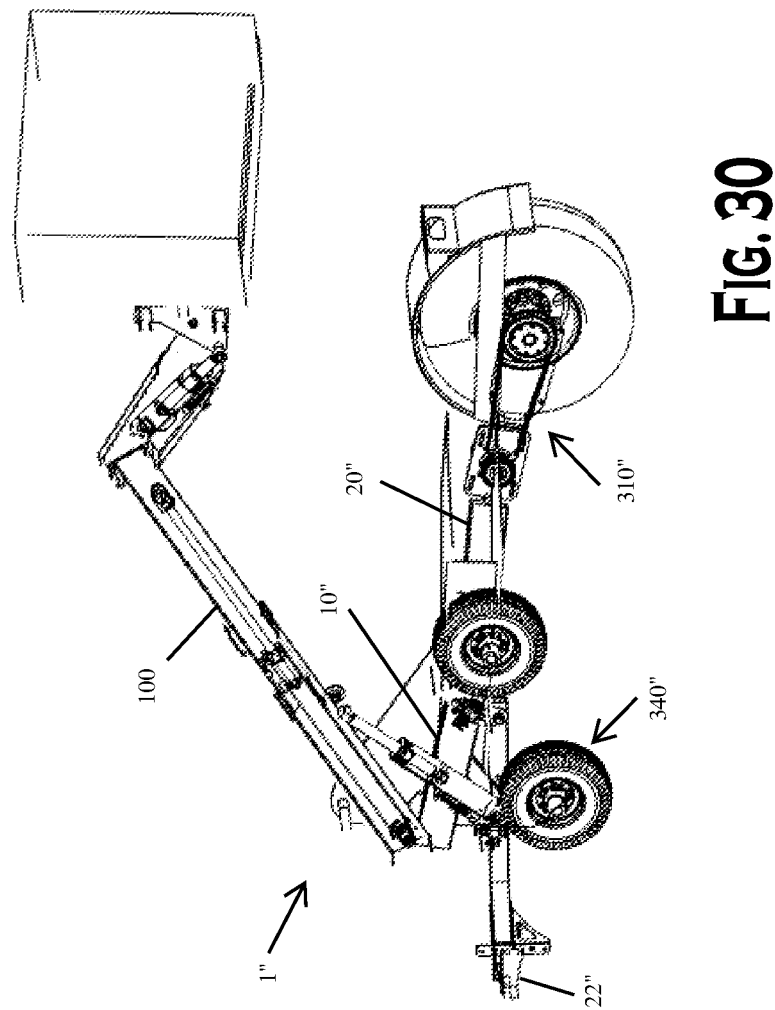
FIG. 30 is a partial cross-section view of the embodiment of the self-propelled trailer of FIG. 27.
Figure 31:
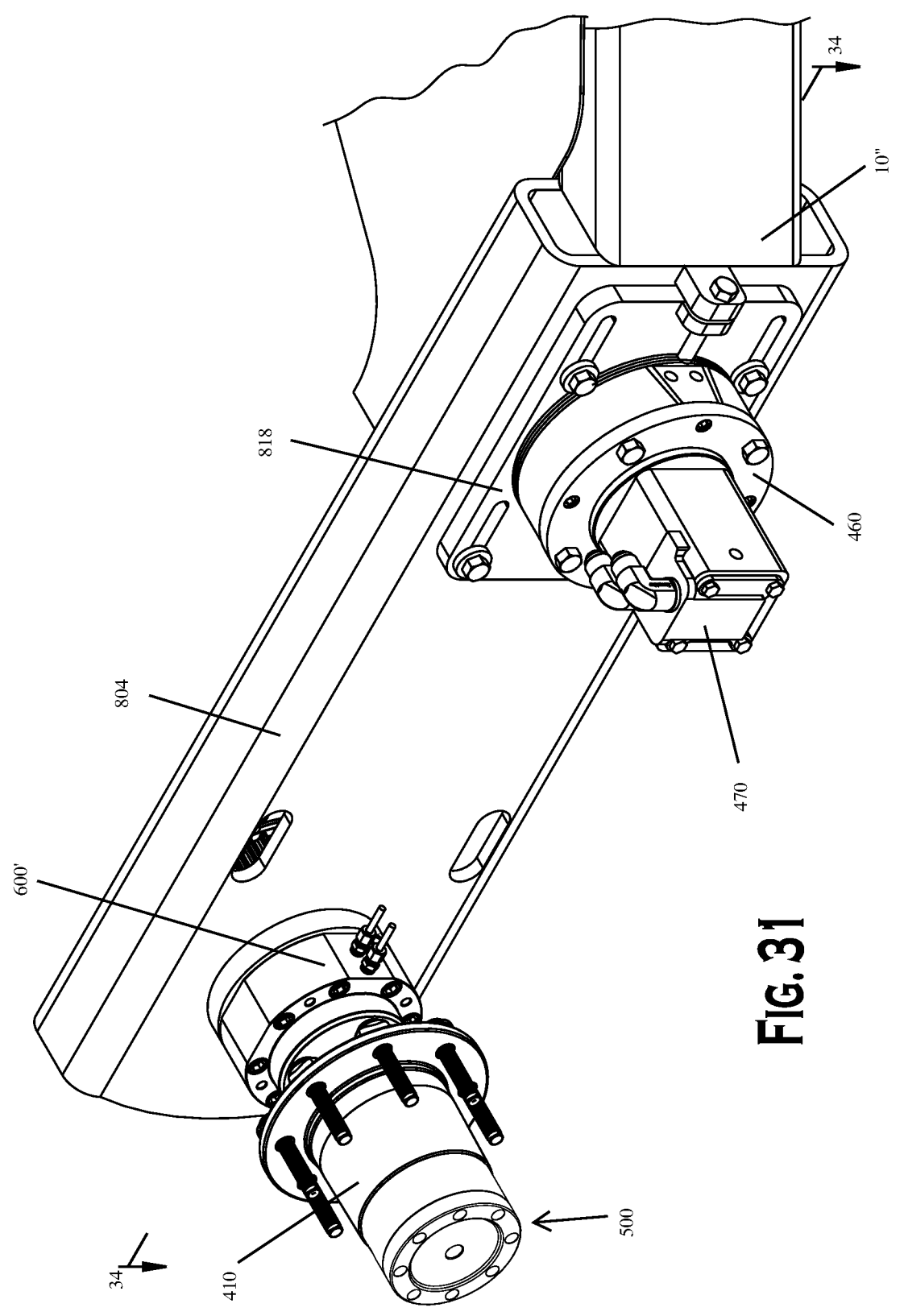
FIG. 31 is an outside perspective view of an embodiment of the selectively engageable drive system depicting the drive motor, and transmission, as well as an embodiment of the locking mechanism and hub assembly, of the self-propelled trailer of FIG. 27.

The selectively engageable drive system disclosed herein may be provided for use with any variety of drive systems that may have a need to be safely engaged or disengaged via operation of a clutch assembly. The selectively engageable drive system may be provided with, for example, various forms of self-propelled vehicles, that may be converted into a non-self-propelled mode, such as may be beneficial for use when towed by a tow vehicle. Various self-propelled trailer embodiments are discussed below. Additionally, it is recognized that the selectively engageable drive system may be beneficially applied in other settings, such as industrial or farm equipment setting, for example, where there is an inclined conveyor belt driven by the drive system, but may occasionally need to be disengaged, such as for performance of cleaning or maintenance. Example applications of the drive system will be discussed, and the manner of operation and components of the drive system will be discussed largely with reference to a self-propelled vehicle, such as that depicted in FIG. 1. Using the teachings herein, one skilled in the art will understand the selectively engageable drive systems taught herein may be beneficially applied in any manner of applications, such as the embodiment of a self-propelled vehicle depicted in FIG. 27, or an exemplary conveyor system driven by an embodiment of the selectively engageable drive system, such those exemplary embodiments depicted in FIGS. 35 and 36.

Figure 1:
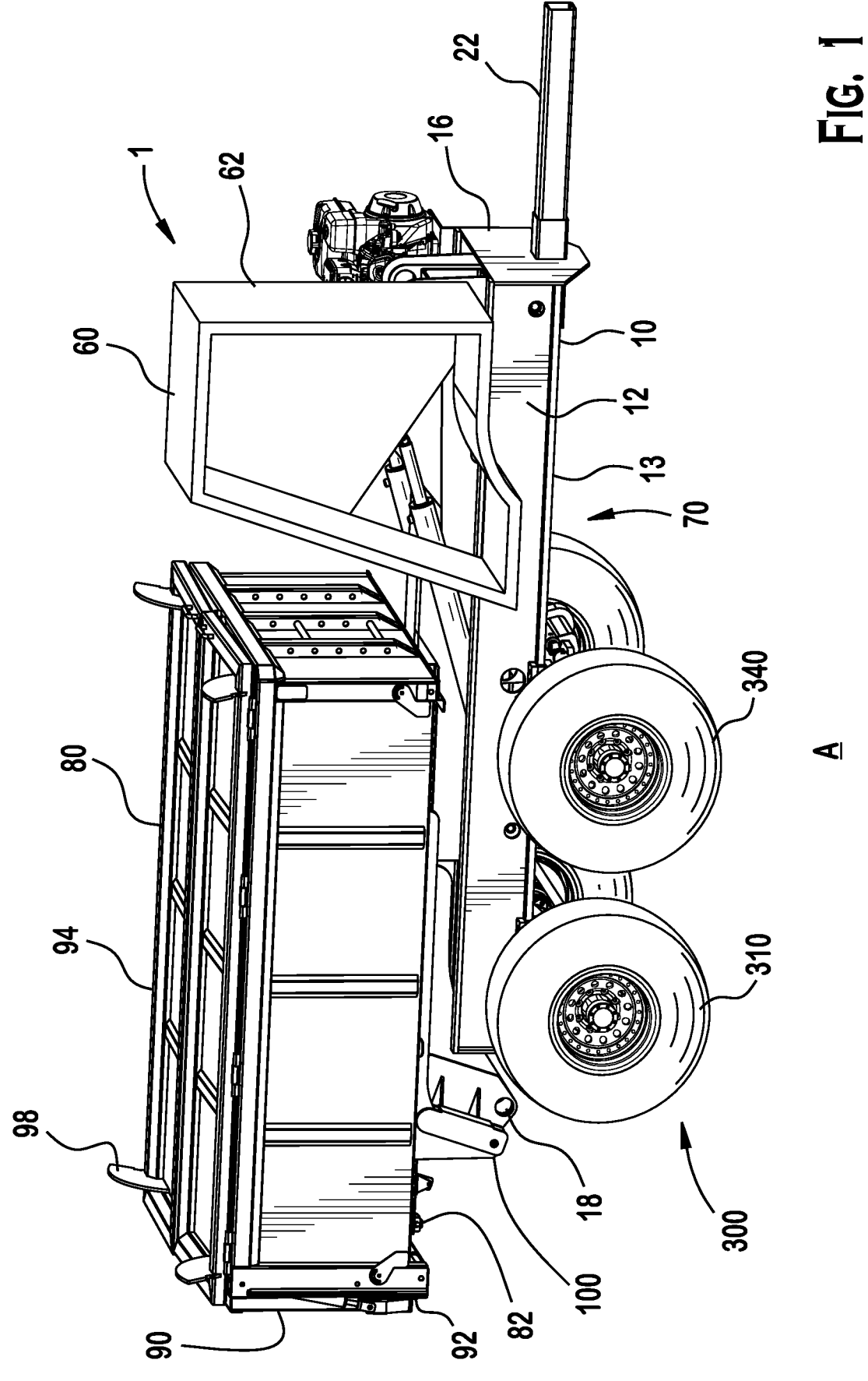
FIG. 1 is a side perspective view of a self-propelled tandem axle trailer, providing an embodiment of the selectively engageable drive system according to the invention.

With respect to FIG. 1, there is provided an exemplary trailer 1 having a selectively engageable drive assembly according to the invention. The trailer 1 may be provided in a form that is ready for towing by a power vehicle, such as a truck with a tow hitch. The trailer 1 generally includes the following major components: a frame 10, a control system 60, a storage bin 80, and an extension device 100, and a tandem wheel assembly 300.

In an exemplary embodiment, the trailer may be towed by a powered vehicle to a work site, using connection section 22, in the form of a trailer hitch 22 positioned and connected to a leading end of the frame 10, and, in particular, the front support 16. The trailer hitch 22 includes a connector for connecting with a truck (i.e., ball mount; not shown).

The trailer 1 may include a wheel assembly 300 positioned under the undercarriage chassis 20 and generally includes a rear wheel assembly 310, a front wheel assembly 340, and an extension assembly 380. The extension assembly may be actuated to extend the tandem wheel assembly, converting the trailer from a towed position, as depicted in FIG. 1, to a self-propelled position, as depicted in FIG. 2.

Figure 2:
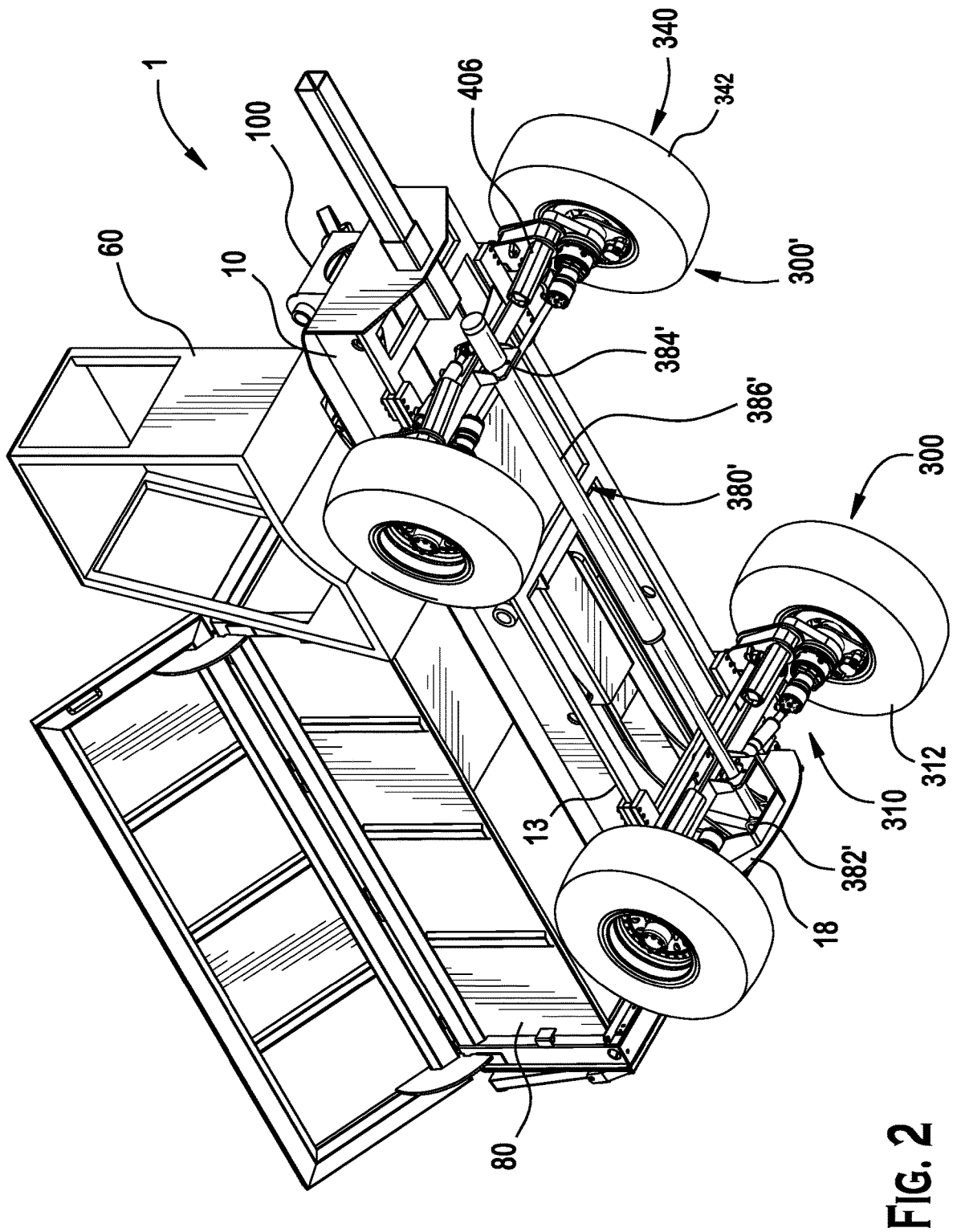
FIG. 2 is a bottom perspective view of the self-propelled tandem axle trailer of FIG. 1.

With reference to FIG. 2, at least one of the front or the rear wheel assemblies may include steering capability. However, one skilled in the art should appreciate that one of the wheel assemblies may be non-steerable. Steering configurations for such trailers are known, and will be understood by those of skill in the art. Any of the wheels of the rear wheel assembly 310 and/or the front wheel assembly 340 may include a selectively engageable drive assembly 330 according to the invention.

FIG. 2 depicts a bottom perspective view of an exemplary self-propelled vehicle providing an embodiment of the selectively engageable drive system. The trailer 1 of FIG. 2 generally includes the following major components: a frame 10, a control system 60, a storage bin 80, and an extension device 100, and the wheel assembly 300. Many of the power system components for selectively powering the drive assemblies are not shown for sake of complexity in the drawings, although a discussion is provided for purposes of enabling one skilled in the art to understand how the drive system is assembled and performed. One skilled in art should appreciate that other designs are possible. For instance, the front drive assembly 360 may include other methods to move the front wheels 342, including chains, belts, or a drive shaft and a transmission connected to a combustion or electric engine, so that trailer 1 can be moved around a work site under its own power. Details of the drive assembly are provided below. Though not depicted in FIG. 2, it is contemplated that the trailer 1 would beneficially include a source of power, similar to the example power source depicted in FIG. 1, and may, in exemplary embodiments, be one or more of batteries and/or combustion engines. The power source may power or otherwise enable the powered movement and actions of the various features of the trailer described herein, including power for self-propelled transport, steering, braking, extension and/or retraction of the tandem wheel assembly, and movement of the storage bin, relative to the frame.

Figure 3:
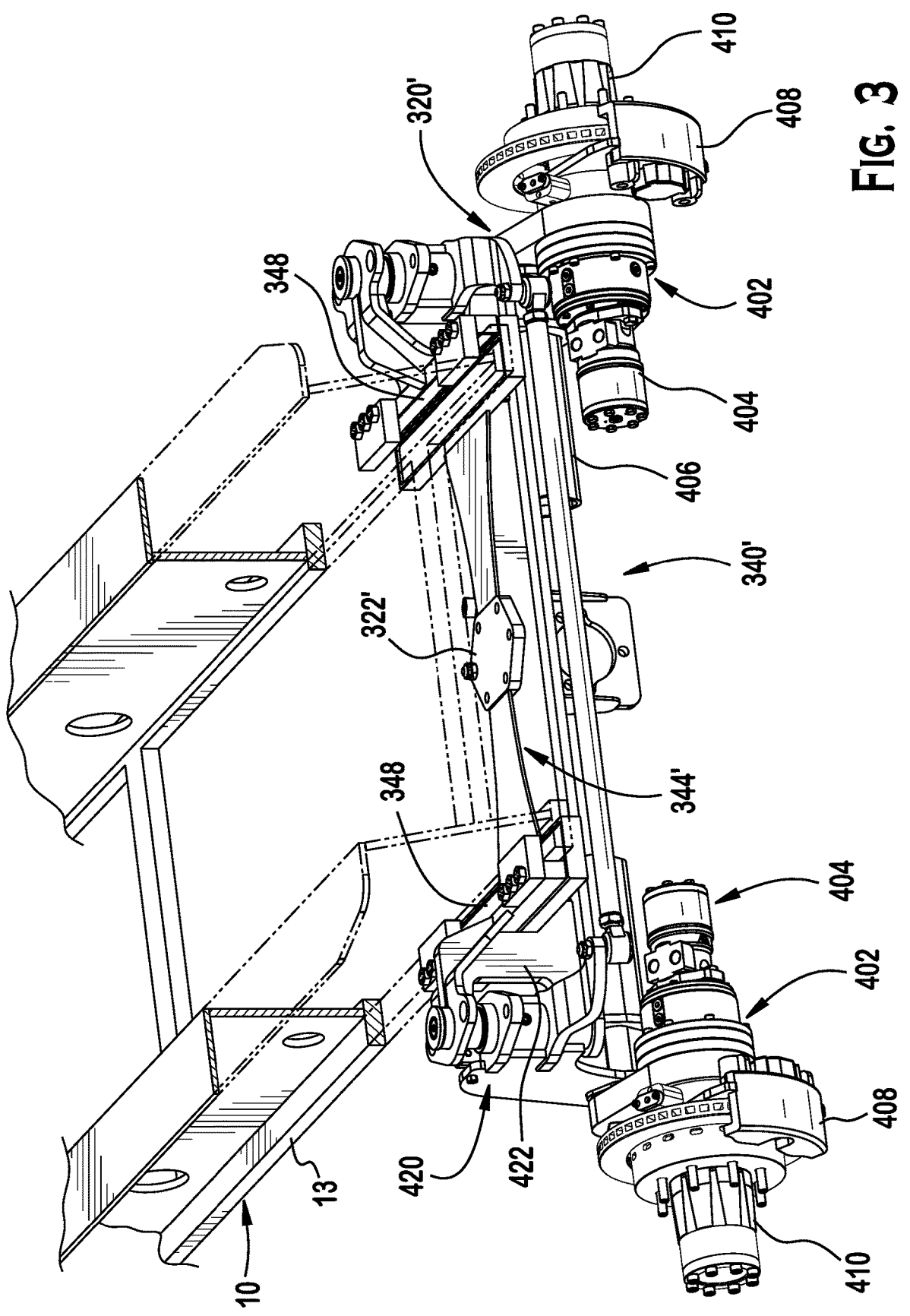
FIG. 3 is a perspective front partial view of an alternative embodiment of a front wheel assembly of the self-propelled tandem axle trailer having a selectively engageable drive system according to the invention.
Figures 6, 7:
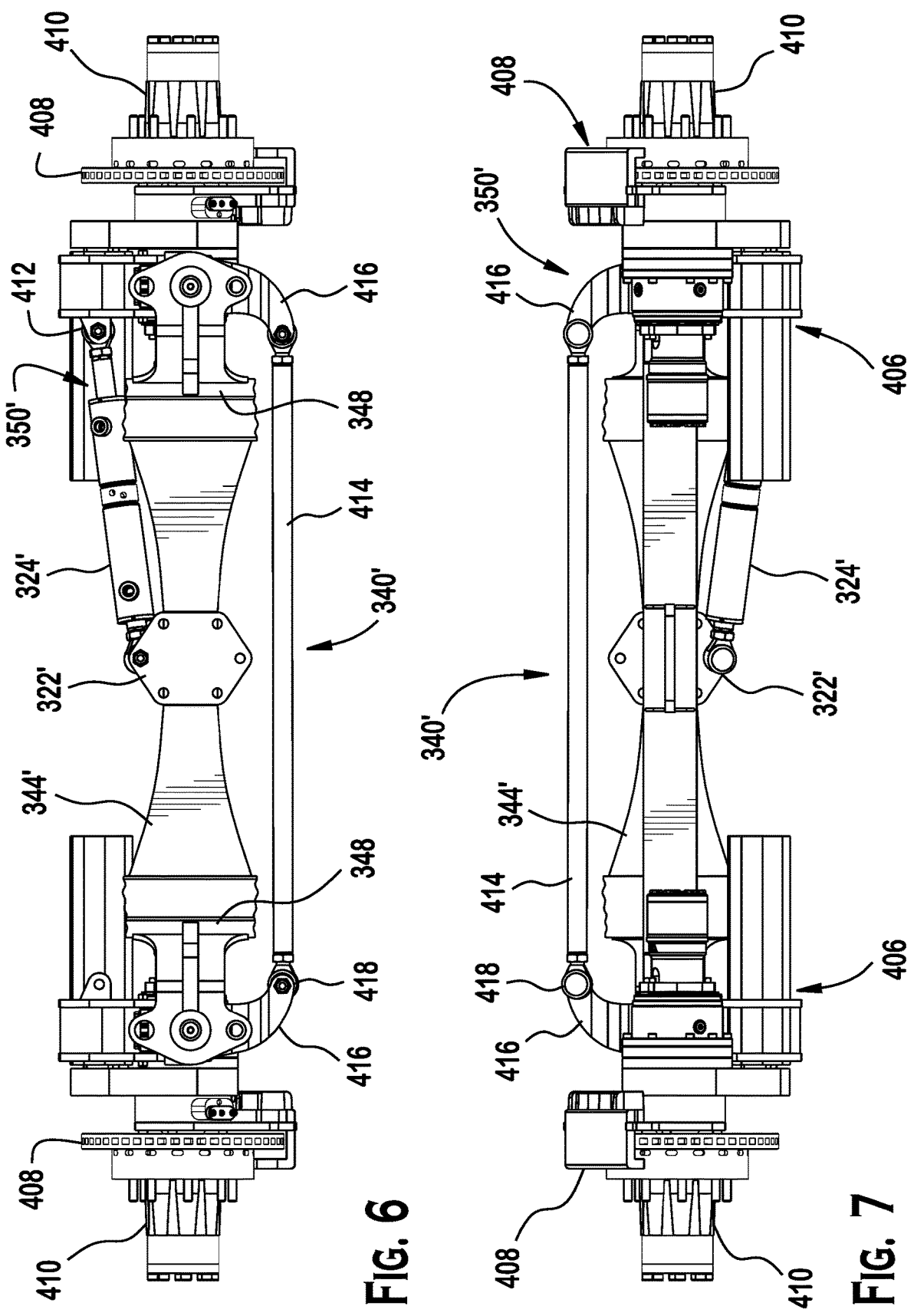
FIG. 6 is a top view of an alternative embodiment of a wheel assembly of the self-propelled tandem axle trailer according to the invention.
FIG. 7 is a bottom view of an alternative embodiment of a wheel assembly of the self-propelled tandem axle trailer according to the invention.

Details of an embodiment of the front wheel assembly 340 and rear wheel assembly 310 will now be discussed with reference to FIGS. 3, 6 and 7. For simplicity, the front wheel assembly 340 will be described, though may be applicable to the features of the rear wheel assembly 310 as well. An isolated front wheel assembly 340 is depicted in FIG. 3 in front perspective view. FIG. 6 presents a top view of the isolated wheel assembly, with the u-shaped brackets for slidingly securing the wheel assembly to the frame, removed for clarity. It is contemplated that where a sliding mount for the wheel assembly is not required, the wheel assembly may be secured to the frame in any suitable manner, as will be familiar to those of skill in the art. FIG. 7 presents a bottom view of the isolated wheel assembly. It is anticipated that the depicted wheel assembly in FIGS. 3, 6 and 7 may be deployed as one or both of the front wheel assembly or rear wheel assembly.

For simplicity, FIG. 3 will be described in the context of being a front wheel assembly 340, though applicable to either front or rear wheel assembly. With reference to FIGS. 3, 6 and 7, the front wheel assembly 340 as shown may be provided with a wheel assembly frame 344', a steering assembly 350', and a pair of selectively engageable drive assemblies 402.

Each drive assembly 402 includes one or more of a motive power assembly 404, an optional suspension assembly 406, a brake assembly 408, and wheel hub 410 upon which a wheel is to be mounted. The front wheel assembly 340 of FIG. 3 may thus provide steering capability, motive and braking force to the trailer 1, as well as optionally providing a suspension assembly, to isolate or minimize the effects of irregular surface features from the frame while the trailer is in motion. The front wheel assembly 340 of FIGS. 3, 6, and 7 may be provided with a steering actuator, and may include a pair of wheel hubs 410 configured to accept the mounting of wheels thereupon, though depicted with the wheels removed for clarity, a motive power assembly 404, a brake assembly 408, a wheel assembly frame 344, a steering assembly 350, and suspension assembly 406. The wheel assembly of FIGS. 3, 6, and 7 may be deployed as either, or both, of the front and rear wheel assemblies.

Each drive assembly 402 for each of the front or rear wheel assemblies, may have a brake assembly 408 including a brake caliper and brake rotor, as will be familiar to those of skill in the art, for slowing and halting the rate of rotation of the wheels. Such a brake assembly 408 may be actuated in any suitable manner, such as hydraulically, electrically, pneumatically, or mechanically.

Each of the wheel assemblies may optionally have a suspension assembly 406, such as a torsion suspension that allows the independent movement of the wheel hub, relative to the wheel assembly frame, and the trailer it is affixed to, as the trailer traverses uneven ground.

Figure 8:
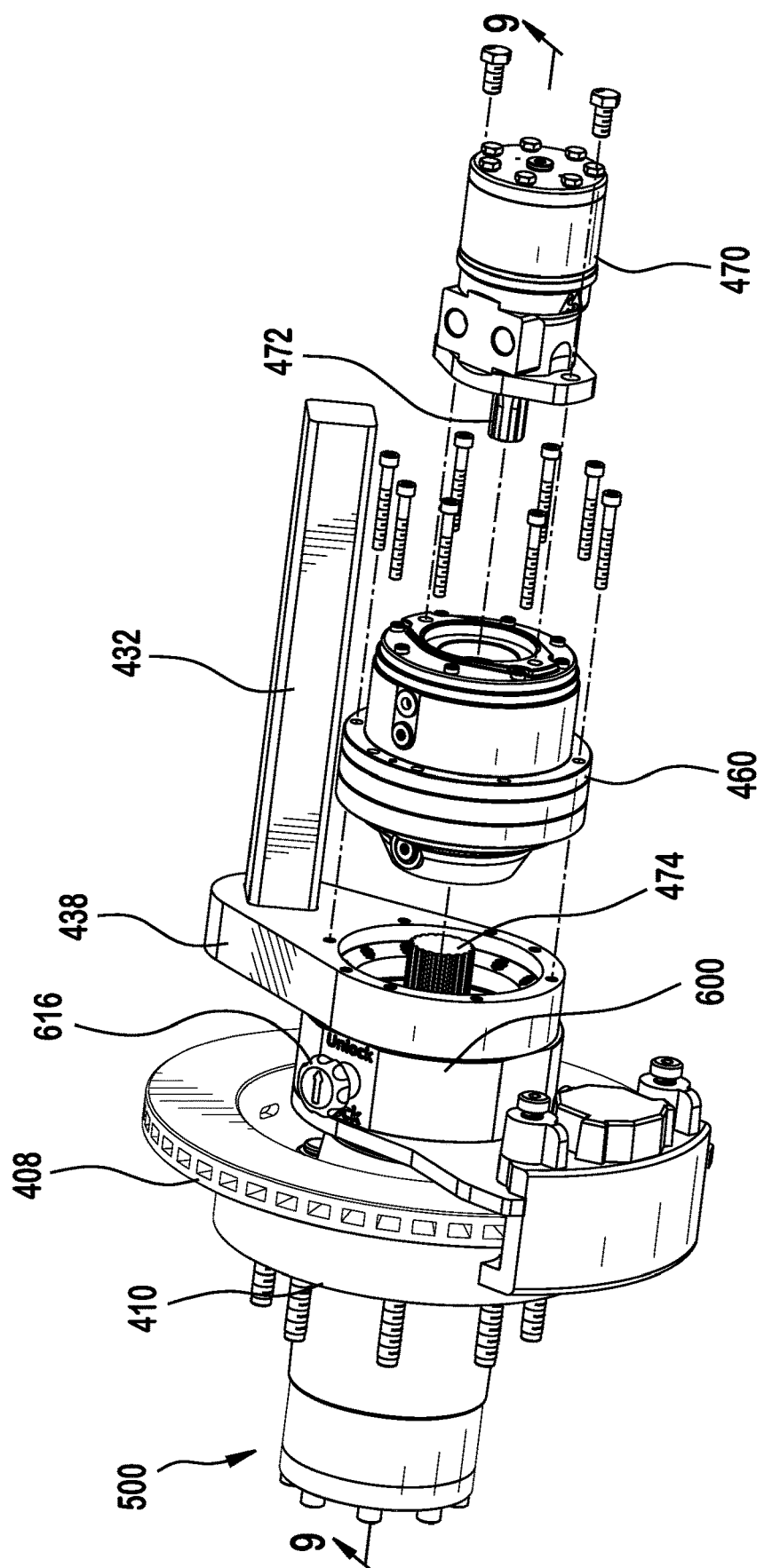
FIG. 8 is a partially exploded view of components of an embodiment of the selectively engageable drive system and the wheel hub assembly depicting the motor, transmission, torsion arm, brake assembly and hub.

In an exemplary embodiment, and with reference to FIG. 8, each of the selectively engageable drive assemblies 402 of the trailer may include a motive power assembly 404, such as a hydraulic motor that is configured to selectively transmit a motive force through the driveline of the drive assembly 402 to cause the hub 410, and thus a wheel mounted upon the hub to turn, thereby propelling the trailer 1. As can be seen with reference to the partially exploded view provided by FIG. 8, a motor 470 may be provided, which may be a hydraulic motor as depicted, though it is contemplated that the motor may instead be any suitable motor, including electric or pneumatic, which when actuated will result in the rotation of the motor output shaft 472 in a selectable direction. In an embodiment, the drive and direction of rotation of the motor 470 for each of the drive assemblies 402 are independently, and selectively reversible, so as to provide adequate maneuverability to the trailer 1 and minimize the turning radius. The rotatable motor output shaft 472 may be directed into an input opening in a transmission housing 460. In an embodiment, the transmission housing 460 may contain a gear reduction system, for example, a planetary gear set, which serves to increase the torque output from the motor, while reducing speed of rotation. The output from the transmission housing 460 is directed to a driveshaft 474, as will be discussed.

Figure 4:
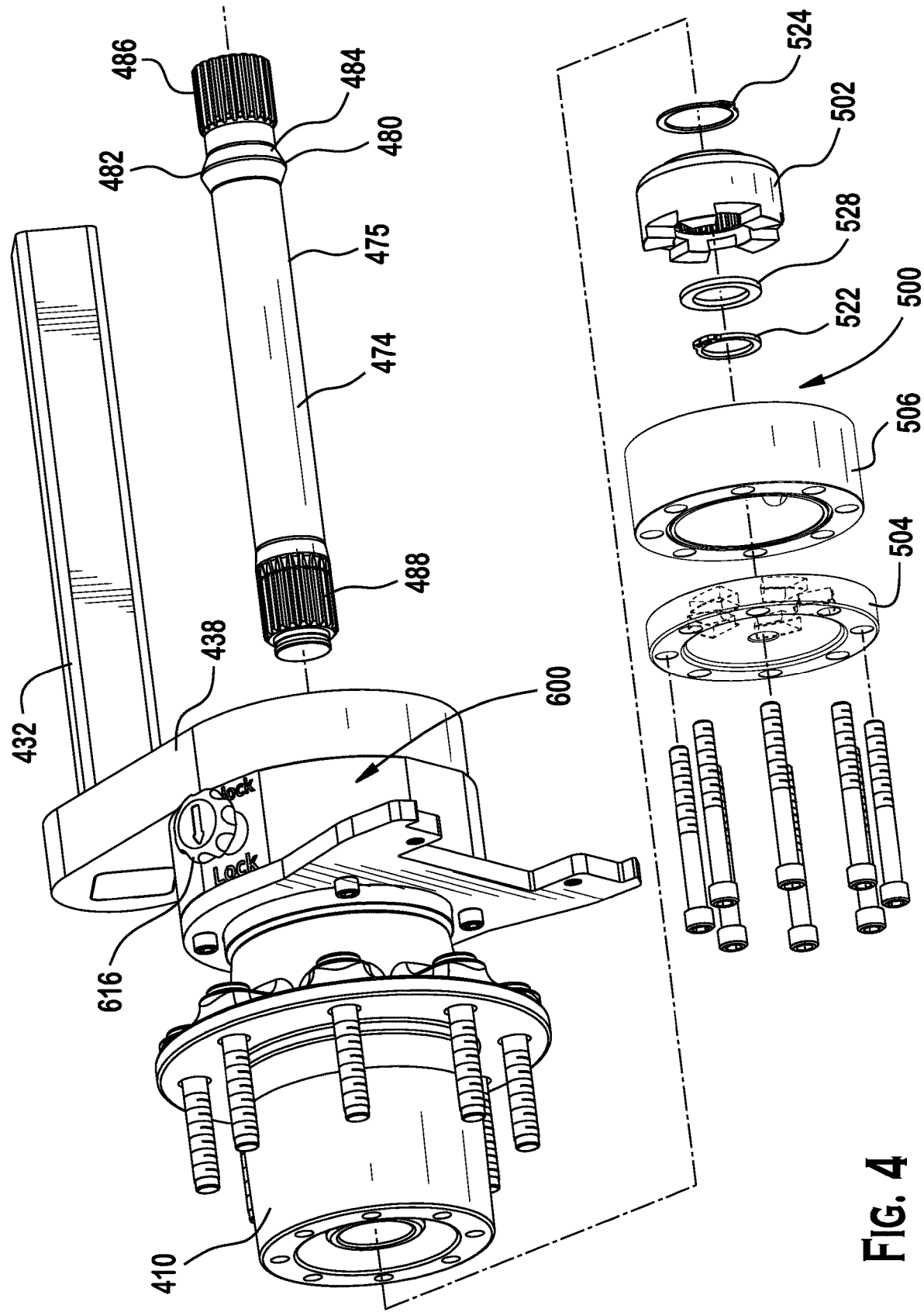
FIG. 4 is a partially exploded view of components of an exemplary embodiment of the selectively engageable drive system and hub assembly, including driveshaft, clutch assembly, locking mechanism, and hub.

As shown in FIG. 4, the selectively engageable drive assembly 402 may be provided with a selectively engageable clutch assembly 500, providing a mechanism allowing each wheel of a wheel assembly to be driven by the motor, or to allow the hub/wheel to free-wheel independently of any rotation of the driveshaft. While the clutch is engaged, motive forces provided by the motor 470 are directed through the transmission 460, if any, and then by the driveshaft 474, whereby the motive forces may be passed through the clutch assembly 500 to cause the rotation of the hub assembly upon which the wheel is mounted, thereby driving the wheel. While the clutch 500 is disengaged, the wheel and hub 410 may spin freely, independent of the driveshaft 474 and motor 470, as may be required while the trailer 1 is being towed by a powered vehicle between locations. The clutch mechanism 500 may be of any suitable type for selectively transmitting torque from the motor to the wheel, as is understood by those skilled in the art, and may include friction, centrifugal, diaphragm, positive, hydraulic, electromagnetic, or vacuum clutches, as non-limiting examples.

Figure 5:
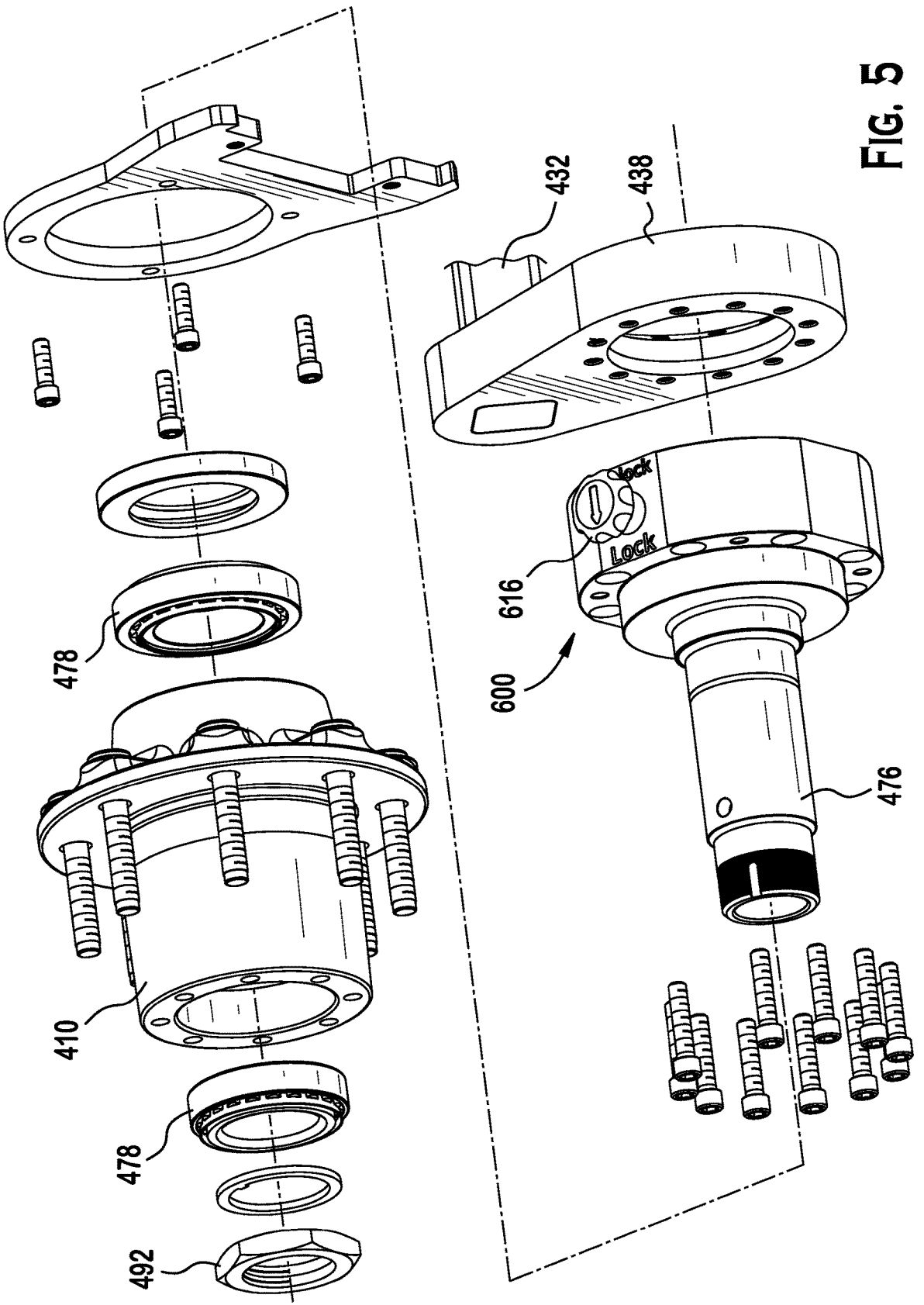
FIG. 5 is a partially exploded view of components of an embodiment of the selectively engageable drive system and hub assembly, including a bell housing with a locking mechanism, hub, and torsion arm.

With reference to FIG. 5, the drive assembly 402 is provided with a bell housing 476 with a locking mechanism 600 provided at the bell end of the bell housing. The locking mechanism 600 serves to control whether the clutch assembly 500 is engaged or not for transmitting motive forces from a power source to drive the wheel hub 410 of the wheel assembly. Actuation and operation of the locking mechanism will be discussed in detail below. The wheel hub 410 is mounted over the bell housing 476, and rotatably secured thereon with at least one bearing set 478, such as inner and outer roller bearings 478 depicted in FIG. 5. The bell housing narrow end may be threaded, in order to receive a lock nut 492 thereon, and thus can secure the hub 410 onto the bell housing 476, while still allowing rotation of the hub, relative to the bell housing. The bell housing 476 at the open bell end is secured to the suspension 432 through suspension arm 438.

Figure 10:
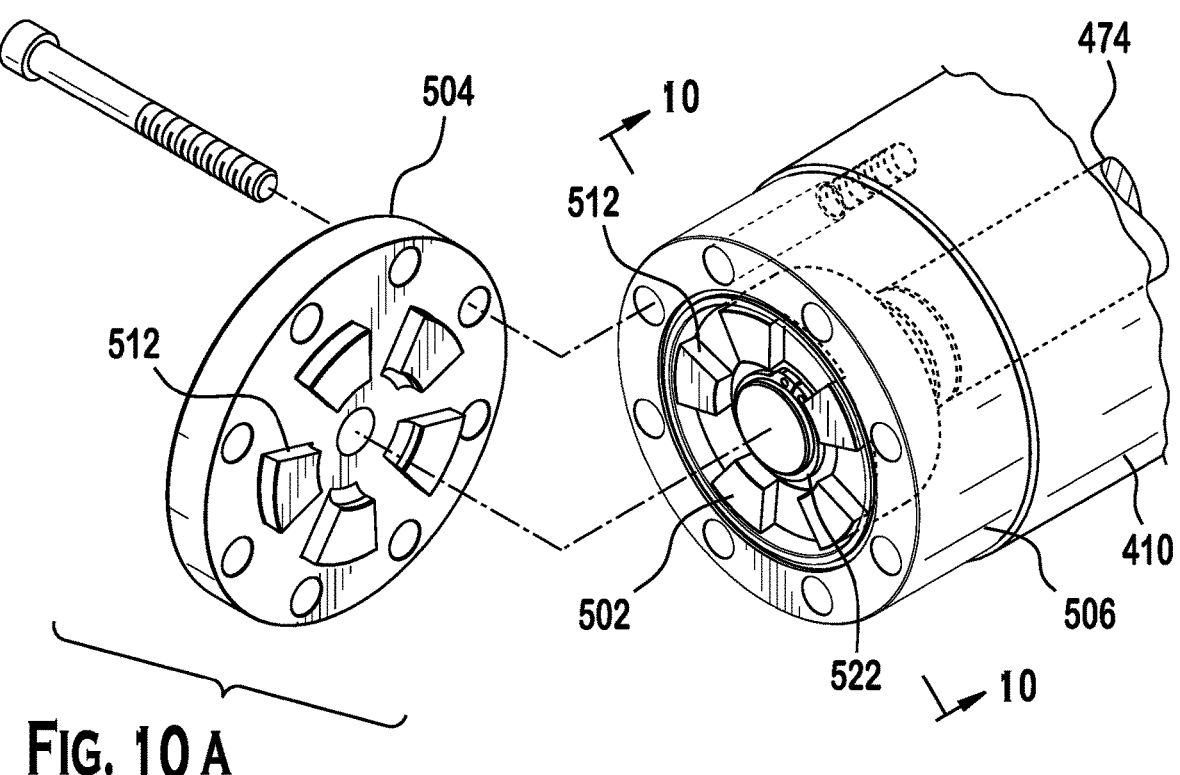
FIG. 10A is close up view of an embodiment of the clutch assembly, depicting the driving and driven clutch elements.
FIG. 10B is a cross-section view through the engaged clutch elements from FIG. 10A, depicting the teeth of each of the driving clutch element against the teeth of the driven clutch element.
Figure 10:
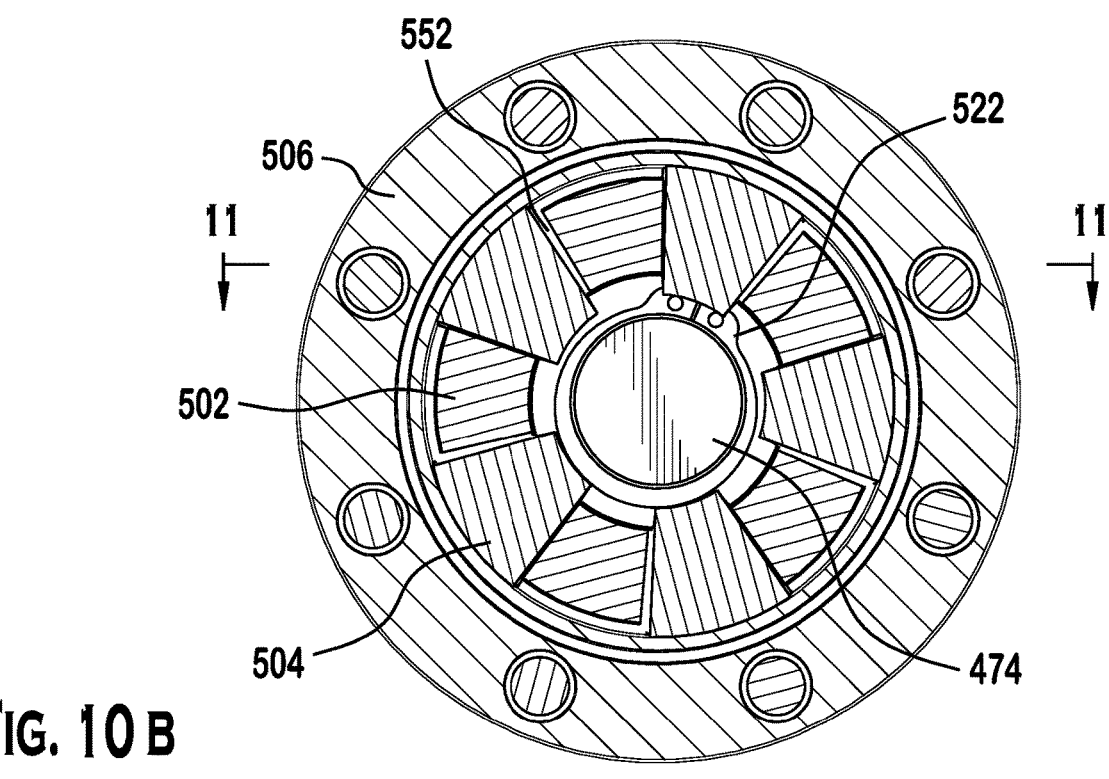
Figure 11:
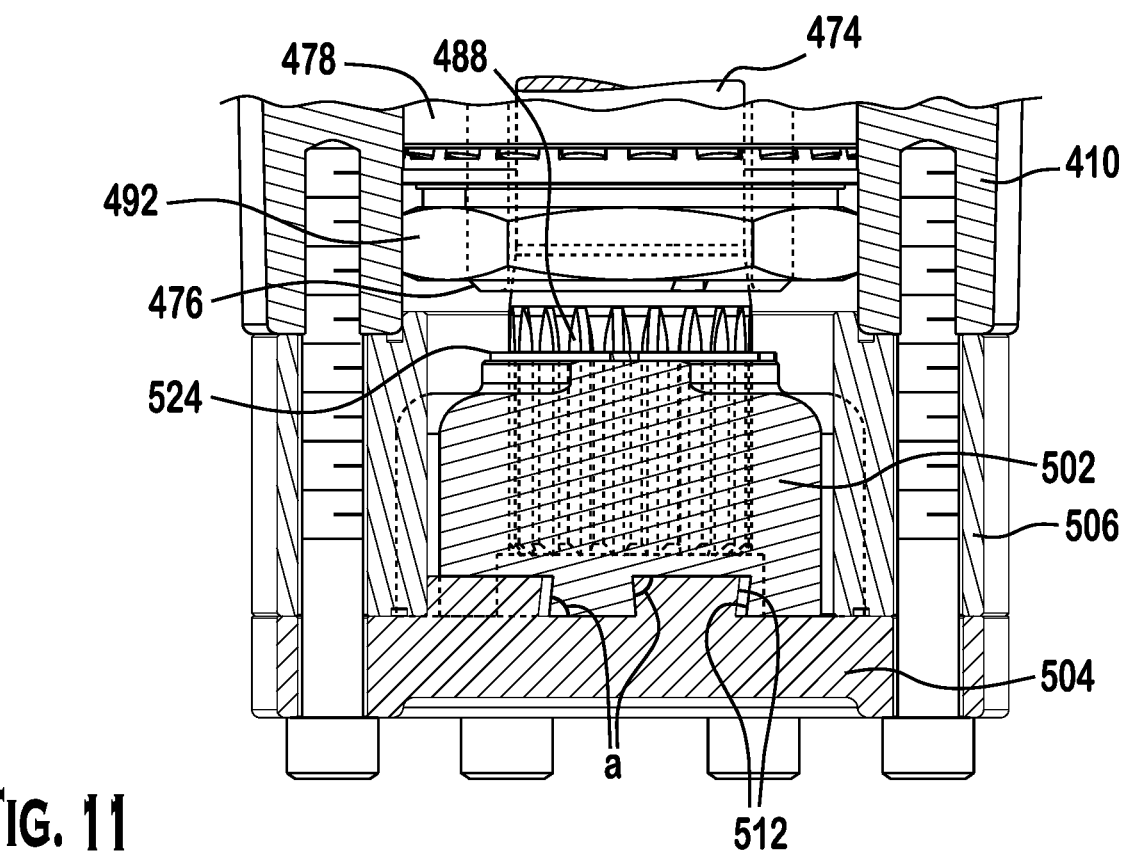
FIG. 11 depicts a close up, cross-section view of an embodiment of the engaged clutch elements and driveshaft of an embodiment of the selectively engageable drive system.
Figure 12:
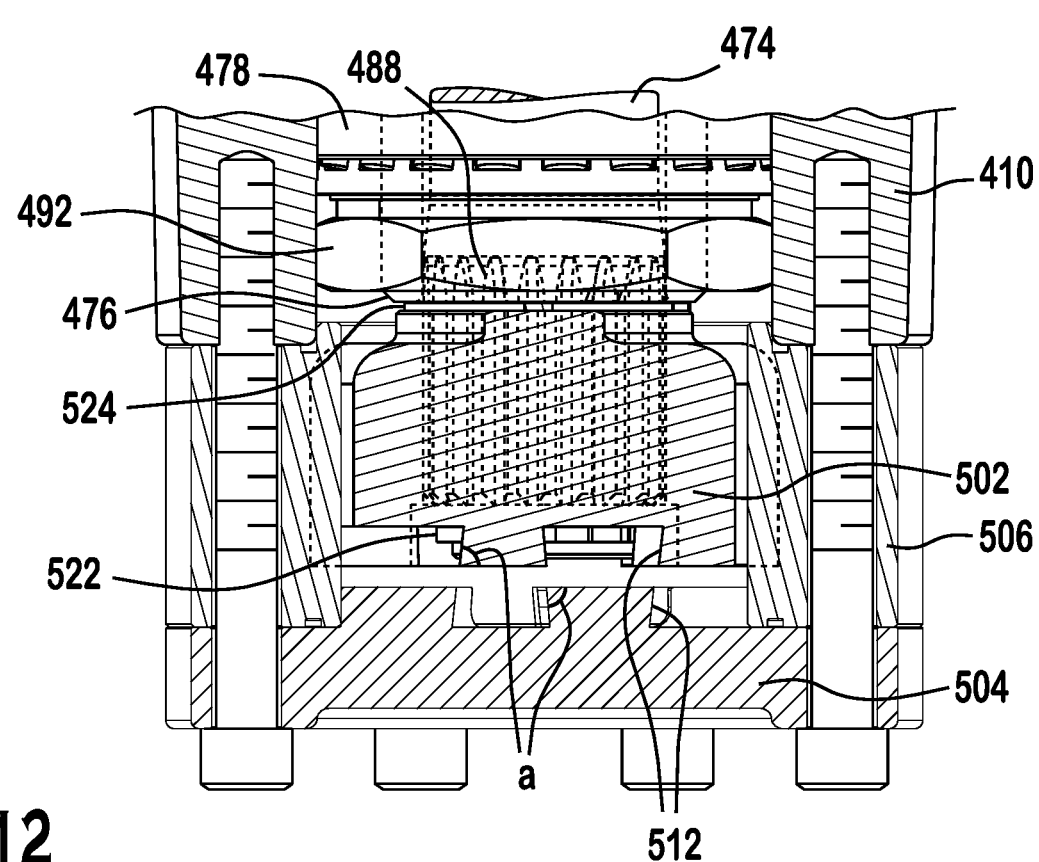
FIG. 12 depicts a close up, cross-section view of the disengaged clutch elements and driveshaft of FIG. 11.

As can be seen with reference to FIGS. 9, 10A and 10B, 11 and 12, the clutch assembly 500 may be caused to engage or disengage with the lateral shifting of the driveshaft 474. As shown in FIG. 10A, the driving clutch element 502 is fixed to an output end 488 of the driveshaft 474. The driven clutch element 504 is mechanically secured to the wheel hub 410 by one or more fasteners, which may pass through an optional spacer 506. While the driveshaft 474 is in the first position, as shown in FIG. 11, the teeth of the driving clutch element 502 will be engaged with the receiving elements (such as teeth) of the driven clutch element 504, in order to positively transmit the rotation of the driveshaft 474 through the clutch 500 elements and to the wheel hub 410. While the driveshaft 474 is in the second position, as shown in FIG. 12, the teeth of the driving clutch element 502 will not be engaged with the receiving elements of the driven clutch element 504, as the lateral shift of the driveshaft 474 is enough to separate the driving clutch element 502 from the driven clutch element 504 from being in rotational interference. Thus, so long as the driveshaft 474 remains in the second position, the driveshaft 474 may be caused to rotate by the motor, and the driving clutch element 502 will also rotate, yet there as there is no contact between the driving clutch element 502 and the driven clutch element 504, and accordingly the driven clutch element 504, wheel hub 410 and wheel will remain isolated from movement of the driveshaft and motor, if any. Moreover, such as where the trailer 1 is being towed, the driven clutch element 504, wheel hub 410 and wheel will be free to turn, without affecting the driveshaft 474 and motor 470, while the driveshaft 474 remains in the second position, and the clutch is disengaged.

In various embodiments, the teeth of the driving clutch element 502, and the teeth of the driven clutch element 504 are provided with side faces 512 to the tooth that are parallel to the complementing side face of the opposing engaging tooth. In an embodiment, the teeth of each clutch element 502, 504 as they engage, are presenting engaging planar surfaces on the side edges 512 of each tooth that are perpendicular to a generally planar top surface of the respective tooth (the plane extending between the top edges of each of the side surfaces of a tooth). In this manner, the teeth of the clutch assembly 500 can slide into engagement when the teeth of each element are at a point or rotation and positioned near each other, with their side faces aligned. In such an embodiment, where there is torque being transmitted through the clutch assembly, friction between engaged planar tooth surfaces may serve to keep the clutch engaged, despite an urging force applied to disengage the clutch assembly, as discussed herein. Once the clutch is unweighted, and is thus significantly free from applied torque forces through the clutch assembly, at that point, the adjoining faces of the teeth may be able to slip past each other to disengage the clutch assembly 500, responding to the urging of the locking assembly, as described herein.

One skilled in the art will recognize that alternative top surfaces, in addition to a top planar surface as depicted, may perform similar to the clutch assembly contemplated herein. It is contemplated, that the top surface therefore need not be limited solely to being a planar surface, and may provide, for example, concave or convex surfaces. Care must be taken to ensure that the convex surface does not protrude above the rest of the tooth to the extent that the convex surface might interfere with clutch disengagement. It is contemplated that slight convexity of the tooth profile may aid in engaging the teeth of the clutch assemblies into rotational engagement, as the teeth would seek to slide relative to each other when urged together to enter into an engaged state.

In another embodiment, the teeth of each clutch element 502, 504 present engaging planar surfaces on the side edges 512 of each tooth that are slightly acute relative to the plane of the top surface of the respective tooth, as can be seen with reference to the end-on toothed profiles visible in FIGS. 11 and 12. As shown in profile view, the intersection of the top surface of the tooth with the planar side edge 512 forms an angle "a" that is less than 90°. In this manner, the engaged teeth of the clutch elements 502, 504 will more tightly engage the clutch assembly 500 as torque forces are transmitted through the clutch components 502, 504, such as when motive force is transmitted through the clutch assembly 500 to drive the wheels. In such an embodiment, the acute angles of the sides 512 of the teeth, present complementary angled planar surfaces that would tend to urge the driven clutch element 504 and the driving clutch element 502 towards each other and into tighter engagement as torque forces are transmitted through the clutch elements

502, 504. That is, when viewed in a profile view along the radial axis extending through one of the teeth, the protruding top of the tooth is wider than the rest of the tooth profile, and would appear similar to a dovetail feature, as is known from woodworking, only with the spacing between each of the teeth adjusted to allow a limited amount of rotation in either direction, when the clutch elements are in rotational interference with each other as depicted in FIG. 11. Such spacing between dovetailed jaws can be seen with reference to the FIG. 10B, showing in cross section the teeth of driving clutch element 502 and driven clutch element 504 when they are positioned laterally approximated and in rotational interference. Note that there is a small amount of space 552, where the components could be rotated relative to each other, where the space between neighboring sets of teeth corresponds to less than 20°, or less than 15°, or less than 10°, or less than 6°, or less than 3° of rotation from engaging in one direction to the other. To engage such clutch elements with the undercut profiled teeth, the driving clutch element 502 is moved into rotational interference with the driven clutch element 504, by laterally shifting the driveshaft 474 into the first position and adjusting the clutch assembly 500 from the position depicted in FIG. 12 to that depicted in FIG. 11. Engagement of the clutch assembly 500 should be performed before there is significant, or any torque being transmitted through the clutch assembly 500, in order to case the engagement of the toothed components, such that the teeth of the driving clutch element are able to fit between, and shift into engagement with, the teeth of the driven clutch element 504.

The driven clutch element 504 and the driving clutch element 502 will tend to remain urged together by the dovetail profile of the teeth, for as long as there is torque being transmitted through the clutch assembly 500. This is due to the angle of each of the planar faces on the sides 552 of the engaged teeth, where torque forces would tend to slidingly urge the driving clutch element 502 further towards the face of the driven clutch element 504. Disengagement of the clutch assembly thus requires removal of the torque through the clutch assembly, in order to overcome the dovetail engagement provided by the tooth profile of the engaged clutch components depicted in FIG. 11 and to allow the lateral shifting of the driveshaft 474, and retraction of the driving clutch element 502 out of engagement with the driven clutch element 504. In an embodiment, the unweighting of the clutch and disengagement of the clutch elements may be facilitated by a slight reversing movement of the engagement, in an amount that allows the angled surfaces of the teeth to slide past each other. Thus, disengagement of the clutch assembly 500 will occur only when the clutch assembly 500 is unloaded and substantially free from torque transmission in either direction (from the driveshaft to the wheels, or the wheels to the drive shaft) such that the teeth of the clutch elements 502, 504 may become disengaged, as the driveshaft 474 is then able to return to the second position, and adjusting the clutch assembly 500 from the position depicted in FIG. 11 to that depicted in FIG. 12. With the driveshaft 474 returned to the second position, the teeth of the clutch elements 502, 504 are removed from being in rotational interference, such that the wheel hub 410 is now able to free-wheel, and can rotate independently of the driveshaft 474 and motive power source, such as may be beneficial when being towed by a tow vehicle.

In an embodiment, it is contemplated that the driven clutch element 504 of FIG. 10A may be manually reversible in the orientation of mounting, so as to present the face of the driven clutch element 504 with the recessed surface, that is normally positioned to the outside of the clutch assembly 500, instead being positioned to face inwards, and towards the driving clutch element 502. When the driven clutch element 504 is physically removed, and then replaced in this reversed orientation, the clutch assembly 500 will always be disengaged, regardless of the position of the driveshaft 474, such that the hub 410 will free wheel, though it may remain subject to braking application, as previously described. In this manner, should it be necessary, one wheel hub assembly drive system may be disabled, as may be useful in the event of a malfunction, or equipment breakage. The removal and reversal of the driven clutch element 504 is accomplished by removing the fasteners securing the driven clutch element 504 to the hub 410, such that the driven clutch element can be physically removed, and replaced with the normally exterior facing recessed surface (as can be seen in FIG. 4) now directed inwards towards the driving clutch element 502.

In an embodiment, one or more of the selectively engageable drive assemblies 402 provide a driveshaft 474 having a power input end 486, and an output end 488. The input end 486 of the driveshaft 474 is configured to be rotated by a source of motive power, such as motor 470, optionally with transmission 460 provided between the motor 470 and the driveshaft 474, as depicted in FIG. 3.

Alternatively, it is contemplated that the driveshaft 474 may be provided with an input pulley mounted on the power input end 486 of the driveshaft 474, such that motive force can be transmitted to the driveshaft via a belt drive, through a belt mounted around the pulley, as will be familiar to those of skill in the art.

The power input end 486 of the driveshaft 474 provides a splined or keyed connection, such that the driveshaft is rotationally fixed, relative to the component causing the self-propelled rotation of the driveshaft 474, whether motor, transmission, or pulley. In this arrangement, the driveshaft 474 has no rotational degree of freedom relative to the power source component, but is provided with lateral degree of freedom, such that the driveshaft is able to slide laterally relative to the position of the power delivery component e.g., motor 470, transmission 460, or input pulley 810 (as shown in FIGS. 27-34). The lateral freedom of movement of the driveshaft 474 allows the driveshaft to be controllably moved to engage or disengage the clutch assembly 500 provided in the driveline between the wheel hub 410, and the source of motive power, such as motor 470. The output end 488 of the driveshaft may be mechanically fixed to the driving clutch element 502 with one or more fasteners, to ensure that the driving clutch element 502 is rotationally, and laterally fixed on the end of the output end 488 of the driveshaft 474. In the embodiment depicted in FIG. 4, the output end 488 of the driveshaft 474 is also splined, such that a driving clutch element 502 with a corresponding mating interior surface can be slid onto the output end 488 of the driveshaft. This splined, or other suitable keyed connection, ensures that the driveshaft 488 is rotationally fixed with the driving clutch element 502. As depicted in FIG. 4, the driving clutch element 502 may be laterally fixed upon the output end 488 of the driveshaft 474 through the use of one or more retainers, such as front retainer ring 522 and back retainer ring 524. It is contemplated that one or both of the retainer rings 522, 524 may be provided, secured in corresponding receiving grooves provided on the driveshaft near the splines of the output end 488, in order to provide a physical limit to the lateral movement of the driving clutch element 502 relative to the driveshaft 474, such that the driving clutch element 502 becomes substantially fixed on the output end 488 of the driveshaft, and will move laterally in concert with the lateral shifting of the driveshaft 474. In an embodiment, there may optionally be provided one or more washers 528 between one or both of the retainer rings 522, 524 and the respective surface of the driving clutch element 504 that the respective retainer ring is abutting against. In this manner, the driving clutch element 502 is rotationally fixed to the output end 488 by the splined engagement, but is also fixed with regard to lateral movement, relative to the output end of the driveshaft 474, such that as the driveshaft 474 when caused to shift laterally, and/or rotate, the driving clutch element 502 will move in concert with the output end 488 of the driveshaft 474. Alternatively, it is contemplated that a fastener may be directed through the driving clutch element 502, and secured to the driveshaft 474, such as a threaded central bore in the end of the driveshaft.

Figure 9:
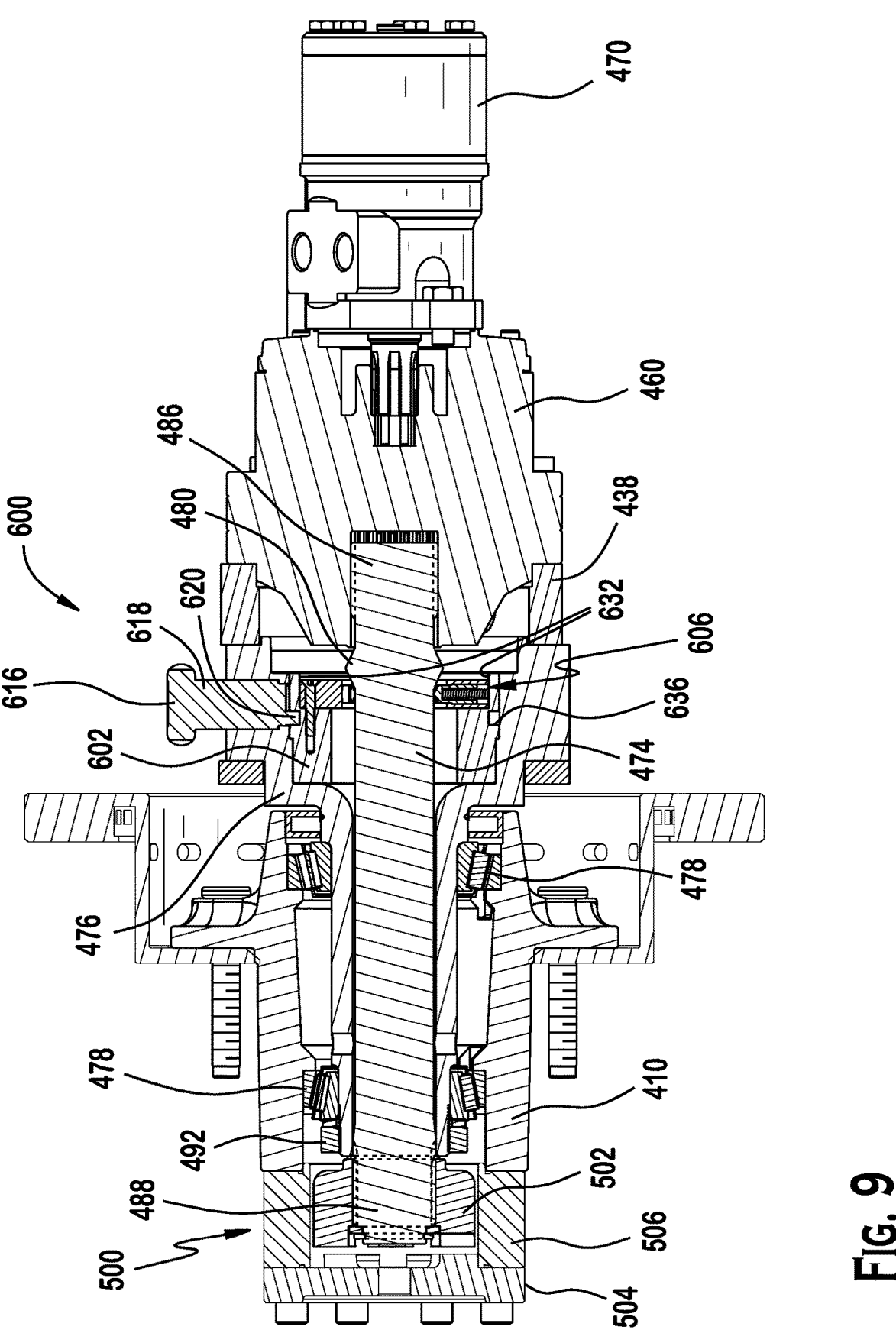
FIG. 9 is a cross-section view of components of an embodiment of the selectively engageable drive system and the wheel hub assembly.
Figure 13:
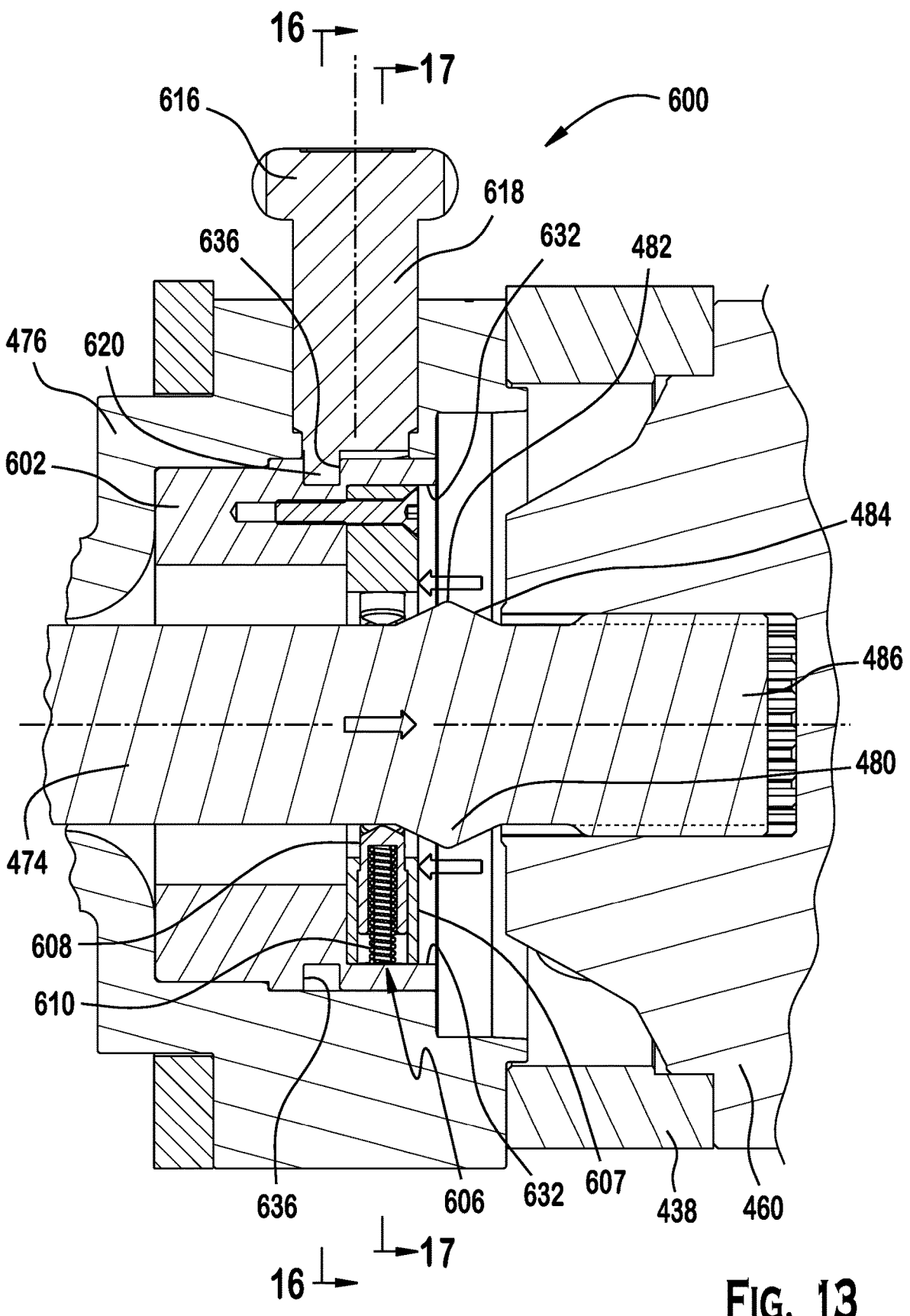
FIG. 13 depicts a cross-section view of an embodiment of a manually controlled locking assembly and driveshaft an embodiment of the selectively engageable drive system and the wheel hub assembly, with the locking assembly provided in an unlocked configuration.
Figure 14:
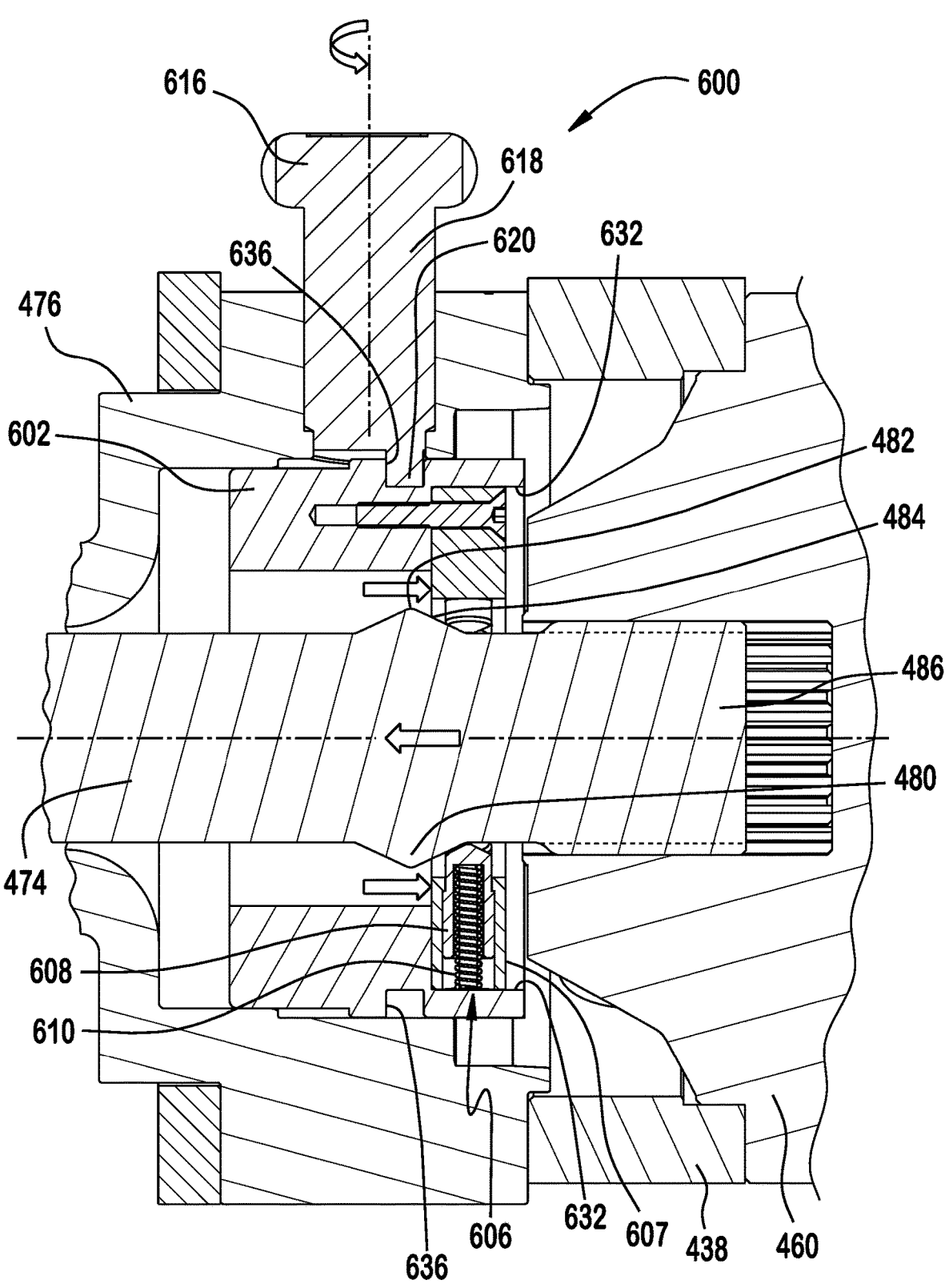
FIG. 14 depicts a cross-section view of the manually controlled locking assembly and driveshaft of FIG. 13, only now provided in a locked configuration.

As can be seen with reference to FIGS. 4 and 9, and in enlarged view in FIGS. 13 and 14, the driveshaft 474 is provided with an annular protrusion 480, shown here as a protruding portion extending around the circumference of the driveshaft 474. As shown, the annular protrusion is provided on the portion of the driveshaft that is to be extended through the locking assembly 600. The annular protrusion 480 may be provided as an expanded ring portion extending beyond the nominal diameter 475 of that portion of the driveshaft, and has an apex 482, at the greatest extent, or peak of the annular protrusion 480. On either side of the apex 482, the annular protrusion 480 provides bearing surfaces 484. As can be seen with reference to FIG. 13, the cross-section profile of the annular protrusion 480 provides the bearing surfaces 484 in the tapering portion from the apex 482 down to a transition point where the annular protrusion ends and transitions to the nominal driveshaft dimensions 475 of the neighboring portions of the driveshaft 474. The tapered profile of the bearing surfaces may be linear, such as the straight ramped profile for the bearing surfaces depicted in FIG. 13, though one skilled in the art that alternative profiles are possible, such as a non-linear taper, which may be provided by a curved or irregular ramped profile. As can be seen in the cross-section view of FIG. 9, the driveshaft 474 at each of the input end 486 and output end 488 may optionally be somewhat varied in dimensions as well, in order to facilitate securement to the connecting portions of the driveline, such as the driving clutch element 502 to the output end 488 of the driveshaft, or the sliding engagement feature, e.g., splines or keyed portions at one, or both ends of the driveshaft. The driveshaft 474 is extended through at least the length of the bell housing 476, with each of the driveshaft input and output ends 486, 488 extending out from the dimensions of the bell housing.

A first embodiment of the locking assembly 600 will be described with reference to FIGS. 9, 13-22. The first embodiment of a locking assembly 600 provides for the user to manually control the setting of the locking assembly 600, and provides a user actuated handle or knob 616, such that the user may rotate the handle or knob so as to selectively place the locking assembly 600 into a locked or unlocked configuration. An alternative locking assembly 600' depicted in FIGS. 23-26, using like number for like components will also be described below. Unlike the first embodiment of the locking assembly however, the alternative locking assembly 600' instead relies on the user operating controls that employ a power source, or pressurized fluid source, in order to effectuate the locking or unlocking position of the locking assembly 600'. Thus, control of the alternative locking assembly 600' configuration may be achieved, for example, by controllably varying fluid pressures within the locking assembly 600' such as through the use of a fluid pressure source, as in the manner of a hydraulic or pneumatic actuator, as will be explained.

Manual Locking Assembly

The first locking assembly 600 of FIGS. 9, and 13-22 provides for user operated control of the locking assembly 600 to urge the lateral movement of the driveshaft 474, which may be selectively shifted in first and second directions to control the engagement or disengagement of the clutch assembly 500, as described previously. The locking mechanism 600, as shown in FIG. 9, may be positioned near the open bell end of the bell housing 476, and as can be seen in the exploded view of FIG. 15, the first locking mechanism 600 includes at least the following major components: pushing member 602, urging member 606 and a handle assembly providing a handle 616 on the end of a spindle 618, and having an off-center protruding pin 620.

Figure 15:
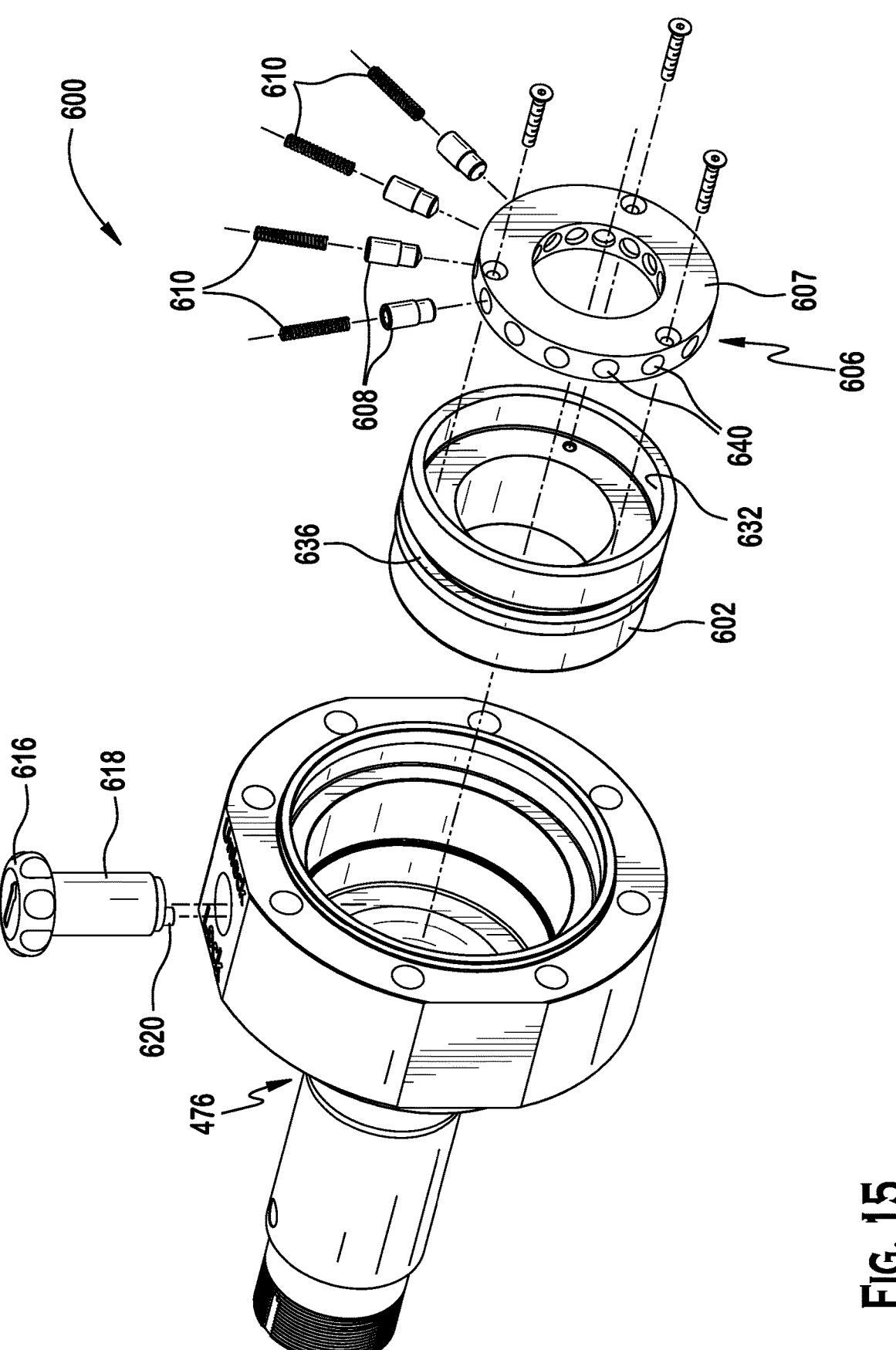
FIG. 15 is a partially exploded view of components of the manually controlled locking assembly of FIG. 13.
Figure 16:
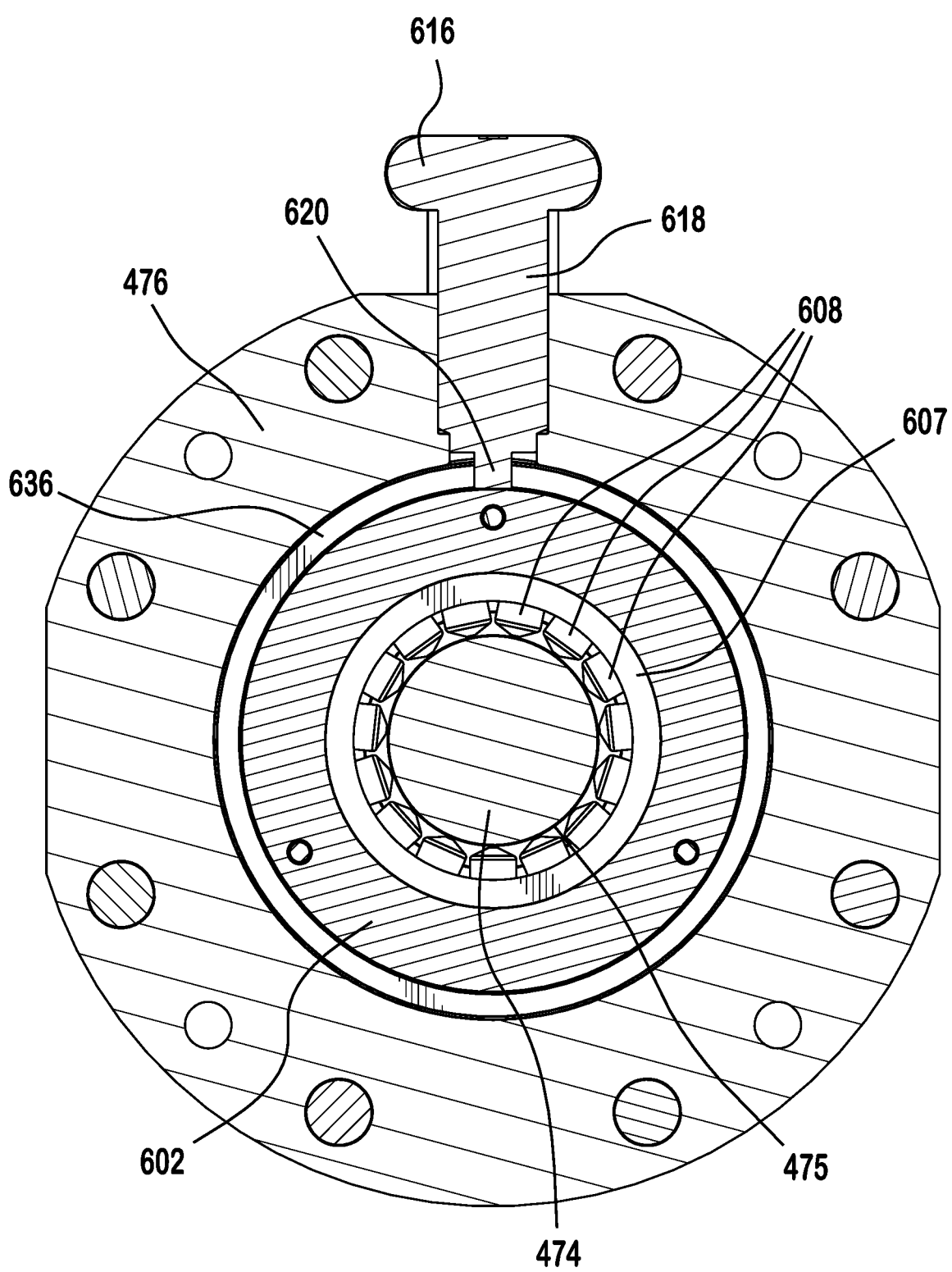
FIG. 16 is a cross-section view of the locking assembly of FIG. 13, taken through the plane along line 16-16.

As shown in the enlarged view of FIG. 13 and the exploded view of FIG. 15, an embodiment of the locking assembly 600 is shown with a pushing member 602 that is a generally annular shape. The cross-section profile of the pushing member is depicted in the cross-section view of the locking assembly 600 depicted in FIG. 9. As shown, the pushing member provides a recess 632 that can receive the urging member 606 therein, such that the urging member can be secured against the pushing member, and fitted within the recess, through the use of one or more fasteners. The pushing member 602 is fitted within the bell housing 476 and can operate as a reciprocating piston that encircles a portion of the driveshaft 474 directed through the bell housing 476. The pushing member 602 is thus configured to translate axially (in a direction parallel to the longitudinal axis of the driveshaft 474). As can be seen with reference to FIGS. 13 and 14, the pushing member 602 in cross-section appears to travel laterally between a first position as shown in FIG. 14, and a second position as shown in FIG. 13. Axial translation (movement parallel to the longitudinal axis of the driveshaft 474) of the pushing member 602 may be achieved by any suitable actuation method, including mechanical control, electromechanical, pneumatic, or hydraulic control. As shown in FIGS. 9, 13, and 14, mechanical control of the pushing member may be directed by the user rotating a knob or handle 616, such that a user can cause the lateral movement of the pushing member 602.

With reference to FIG. 15, and FIG. 13, the spindle 618 is a cylindrical body that extends from the handle 616 and passes through a receiving opening provided in the bell housing 476. The spindle 618 terminates at an end face positioned just above the outer circumference of the pushing member 602. The spindle 618 is configured to rotate about the spindle axis within the bell housing as the handle 616 is operated by the user. The spindle may be retained in position by a friction fit within the opening of the bell housing, or can be secured in any suitable manner, relative to the bell housing, such that rotational movement of the spindle 618 is possible, but the spindle will not readily be removed from the bell housing.

The end face of the spindle 618, away from the handle 616, is provided with a protruding pin 60 that serves as a cam as the pin is mounted off-center from the central axis of the spindle. The pin 620 protrudes from the spindle and is directed into a cam follower slot 636 provided on a portion of the exterior of the pushing member 602. As the pin is off centered on the end of the spindle, rotation of the spindle by operation of the handle 616, will cause the pin 620 to swing in an arc from the position of the pin shown in FIG. 13, to the position shown in FIG. 14. The pin 620 as it is extended into the slot 636 and is retained within the slot as the pin is moved, thereby causes the reciprocating movement of the pushing member 602 between the positions shown in FIGS. 13 and 14. For maximum lateral movement of the pin 620, the spindle may spin through 180 degrees of rotation, though it is contemplated that less rotation may be utilized where the maximum extent of lateral movement of the pin, and therefore lateral travel of the pushing member, is not required. Once the extent of travel is greater than 180 degrees, the extent of travel of the pushing member 602 will appear to be reduced, even though it must travel through the full extent of travel at the 180 degree mark. Alternatively, in addition to varying the extent of rotation of the spindle, one may adjust either, or both of the placement of the pin (distance from the longitudinal center of the spindle), or vary the width dimension of the spindle and the distance of center, in order to provide the desired extent of lateral travel for the pin, and correspondingly control the extent of lateral reciprocation of the pushing member 602.

The urging member 606 provides a collar 607, a plurality of biasing devices 610 and a plurality of plungers 608. The collar 607 is a generally annular ring surrounding the driveshaft 474, positioned near or about the annular protrusion 480 of the driveshaft 474. The collar 607 of the urging member 606 is fitted into the recess 632 of the pushing member 602 and is mechanically secured thereto, for example, with one or more fasteners directed through the collar and into the pushing member. It is contemplated that alternative means of fixing the urging member 606 to the pushing member 602 are possible, and one skilled in the art will recognize that a variety of securement methods could be employed as an alternative to the fasteners shown.

The collar 607 is provided with a plurality of radially oriented openings 640 extending through the radial thickness of the collar. A plurality of radially arranged plungers 608 are provided that can protrude towards the driveshaft 474 from each of the radially oriented openings 640 on the inside edge of the collar 607, with the plungers 608 having a leading end oriented against the driveshaft 474. A biasing device 610, such as a resilient compressible spring, is inserted into one of each of the plurality of radially oriented openings 640 in the collar 607, and against the back end of each respective plunger 608. The biasing device 610 is compressed as the plunger 608 is positioned within the urging member 606, against the driveshaft 474. With the collar 607 of the urging member 606 positioned within the recess 632 of the pushing member 602 and secured thereto, each of the biasing devices 610 would be contained at the outside surface of the collar 607, within the openings 640, by the encircling portion of the recess 632 of the pushing member 602, as can be seen with reference to FIG. 9.

Each of the plungers 608 when positioned within the collar 607 that is secured within the recess 632, are then urged inwards towards the driveshaft 474, as the compressed biasing devices 610 seek to return to an uncompressed state. Thus, each of the plungers are pushed inwards from the radial openings 640 and directing the leading end of each of the plungers 608 against the exterior perimeter of the portion of the driveshaft 474 that has been positioned extending through the locking assembly 600.

Each biasing device 610 may be an elastomeric, resilient member, such as a coil spring, or any other compressible and elastically resilient material that can be provided to push the plungers 608 in the direction of the driveshaft 474 surface. Each of the biasing devices 610 are thus configured to provide a pushing force to each respective plunger 608 of the plurality of plungers, urging the protruding leading ends of the plungers 608 inward against the surface features of the driveshaft 474. In an embodiment, the plungers 608 may be tipped at the leading end with a roller or friction resistant material, such that the plungers can be urged against the bearing surfaces of a rotating driveshaft 474, and not experience or cause significant wear.

In operation of the locking assembly 600 of FIGS. 9, 13-22, the positioning of the pushing member 602 is directly controlled by the user manually throwing a lever or rotating handle 616 having a spindle 618 and off-center protruding pin 620 that engages with and causes the pushing member 602 to reciprocate laterally. In such an embodiment, the spindle 618 operated by the handle 616 or lever with a protruding pin 620 that is positioned off center at the longitudinal end face of the spindle. The pin may be a cam that is slidingly engaged within a cam follower slot 636 provided on the pushing member 602, such that rotational movement of the spindle, by operation of the lever or handle, will cause the pin 620 to move in an arc, and creates a corresponding lateral movement in the pushing member 602 as the pin when traveling through the arc will slide within the slot 636 of the pushing member 602 that receives the pin therein, thereby causing lateral movement of the pushing member. The pushing member 602 will then act upon the urging member 606, altering the positioning of the urging member 606 relative to the driveshaft 474 and the driveshaft protrusion 480, in order to provide an urging force against the bearing surfaces 484 of the protrusion 480 as discussed below.

As depicted in FIG. 14, the handle 616 may be rotated to place the pin 620 in the right most position as the pin travels through an arc by rotation of the spindle 618. The movement of the pin 620 will then serve as a cam, as the pin is caused to slide within the slot 636, serving as a cam receiver, and thereby position the pushing member 602 to the rightmost position. The urging member 606, as it is secured within the recess 632, and secured to the pushing member 602, will be caused to be similarly shift rightwards as depicted in FIG. 14. When the locking mechanism is positioned as shown in FIG. 14, the urging member 606, with the plungers and 608 and biasing devices 610, will now be placed to the right side of the apex 482, and pressing against the right side bearing surface 484. This will apply an urging force against the bearing surface 484 that will urge the driveshaft to shift to the left. This configuration provides the first locking assembly 600 in the locking configuration, where the driveshaft seeks to engage the clutch assembly 500, for creating a positive engagement between the source of motive power connected to the power input end 486 of the driveshaft 474 and the wheel hub 410.

As depicted in FIG. 13, the handle 616 may be rotated to place the pin 620 in the left most position as the pin travels through an arc by rotation of the spindle 618. The movement of the pin 620 will then serve as a cam, as the pin is caused to slide within the slot 636, serving as a cam receiver, and thereby position the pushing member 602 to the leftmost position. The urging member 606, as it is secured within the recess 632, and secured to the pushing member 602, will be caused to be similarly shift leftwards as depicted in FIG. 13. When the locking mechanism is positioned as shown in FIG. 13, the urging member 606, with the plungers and 608 and biasing devices 610, will now be placed to the left side of the apex 482, and pressing against the left side bearing surface 484. This will apply an urging force against the bearing surface 484 that will urge the driveshaft to shift to the right.

This configuration provides the first locking assembly 600 in the unlocking configuration, where the driveshaft seeks to disengage the clutch assembly 500, for removing positive engagement between the source of motive power connected to the power input end 486 of the driveshaft 474 and the wheel hub 410.

Figures 17, 18:
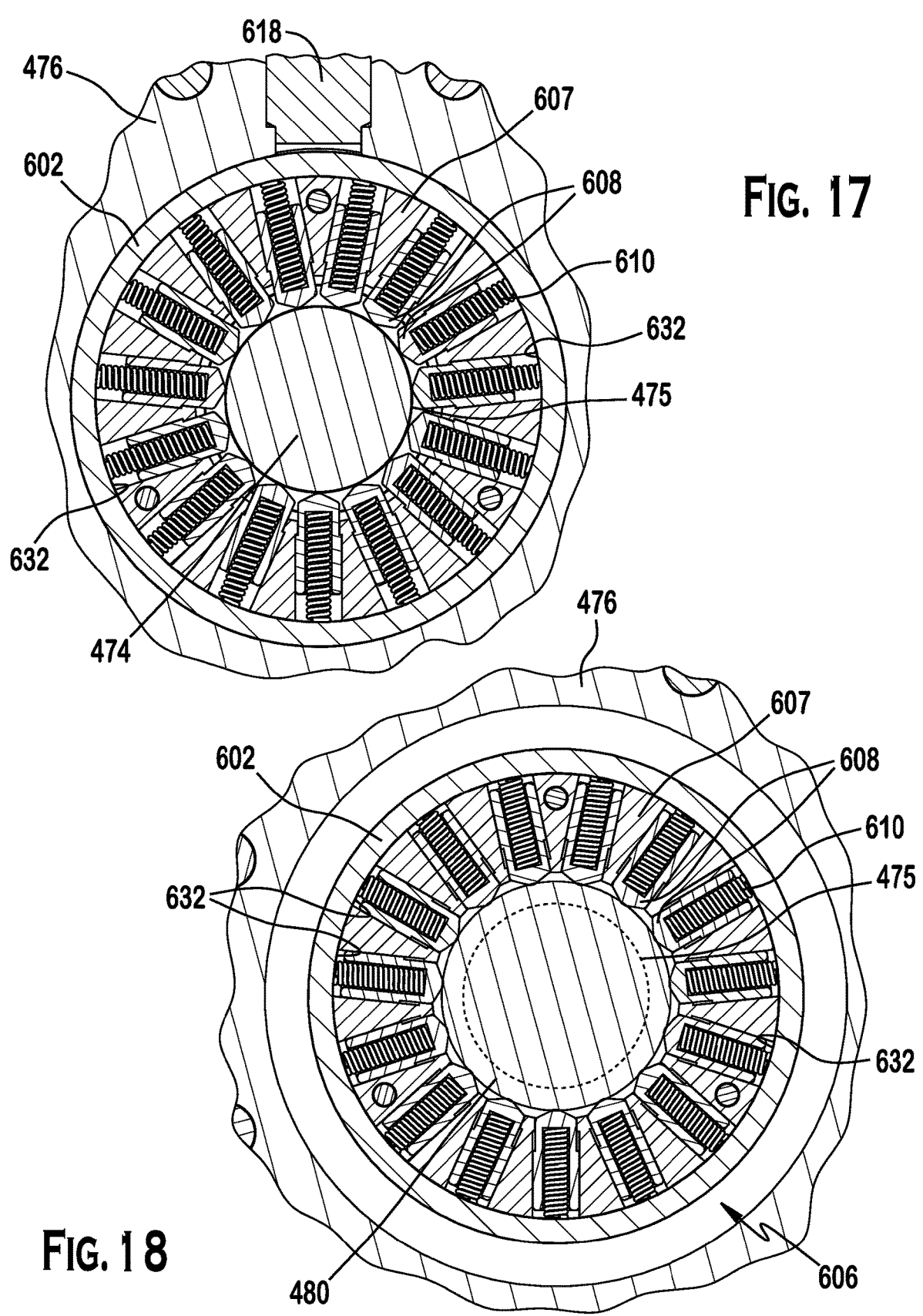
FIG. 17 is a cross-section view of the locking assembly of FIG. 13, taken through the plane along line 17-17.
FIG. 18 is a cross-section view of the locking assembly of FIG. 13, taken through the plane along line 17-17, only with the driveshaft having been shifted to place the apex of the protrusion of the driveshaft in the depicted plane.

Details on operation of the locking assembly 600 of FIGS. 9 and 13-22 will be discussed. For this explanation of the process, it will be assumed that the clutch assembly 500 is in a position that allows the shifting of the driveshaft 474 in response to the urging forces from the urging member 606, in either direction, as the plungers 608 are acting upon the respective bearing surface 484. Thus, this explanation will assume that, where the user rotates the knob 616 and shifts the locking assembly 600 from an unlocked position, as depicted in FIG. 13 to the locked position, as depicted in FIG. 14 the driveshaft 474 will then be assumed to be capable of shifting laterally, without restriction by the relative positions of the components of the clutch assembly 500. As shown in FIG. 13, the locking assembly 600 is depicted with the urging member positioned at the transition of left bearing surface 484 to the nominal driveshaft circumference 475 and having caused the driveshaft 474 to shift laterally to the right and disengaging the clutch. As depicted in FIG. 17, an axial cross-section view of the locking assembly 600 of FIG. 13 is provided, showing a view of the plane passing through the collar 607 of the urging member 606. Another axial-cross section view of the locking assembly of FIG. 13 is provided in FIG. 16, in a plane passing through the pin 620, looking towards the urging member 606. Again, the plungers 608 are shown resting against the nominal circumference 475 of the driveshaft 474, at the transition point to the bearing surface 484. As depicted, each of the plunger 608 are protruding inwards from the collar 607 and are resting against the nominal circumference 475 of the driveshaft 474, with the biasing devices 610 at their lowest level of compression, while contained within the locking assembly. In FIG. 14; the knob 616 has been rotated to a locking position, requiring the plungers to pass over the peak of the protrusion 480 at apex 482, and bearing down against the right bearing surface 484 to urge the driveshaft 474 to the left to engage the clutch assembly 500. As with FIG. 13, the plungers are again resting against the driveshaft 474, at the transition from the right bearing surface 484 to the nominal circumference 475 of the driveshaft 474. The axial cross-section view of FIG. 18 depicts the urging member at a point where the plungers are passing over the annular protrusion 480, such as when cresting over the apex 482. As depicted in FIG. 18, the plungers 608 are urged outwards by the expanded diameter of the driveshaft at the apex 482 of the annular protrusion 480. The nominal driveshaft circumference 475 is shown for reference as the dashed circle. Note that in FIG. 18, the plungers are forced to retract nearly completely into the collar 607, with only the leading ends of the plungers 608 remaining protruding. In this state, the biasing devices 610 are at their peak level of compression, compressed between the retracted plungers 608, and the retaining interior surface of the recess 632. Once the urging member has moved and crested over the apex 482 (in either direction) the compressed biasing devices 610 seek to return to their lesser compressed state, and urge the plungers 608 to bear down on the bearing surface 484, which applies the lateral shifting urging force to the driveshaft 474.

Figure 19:
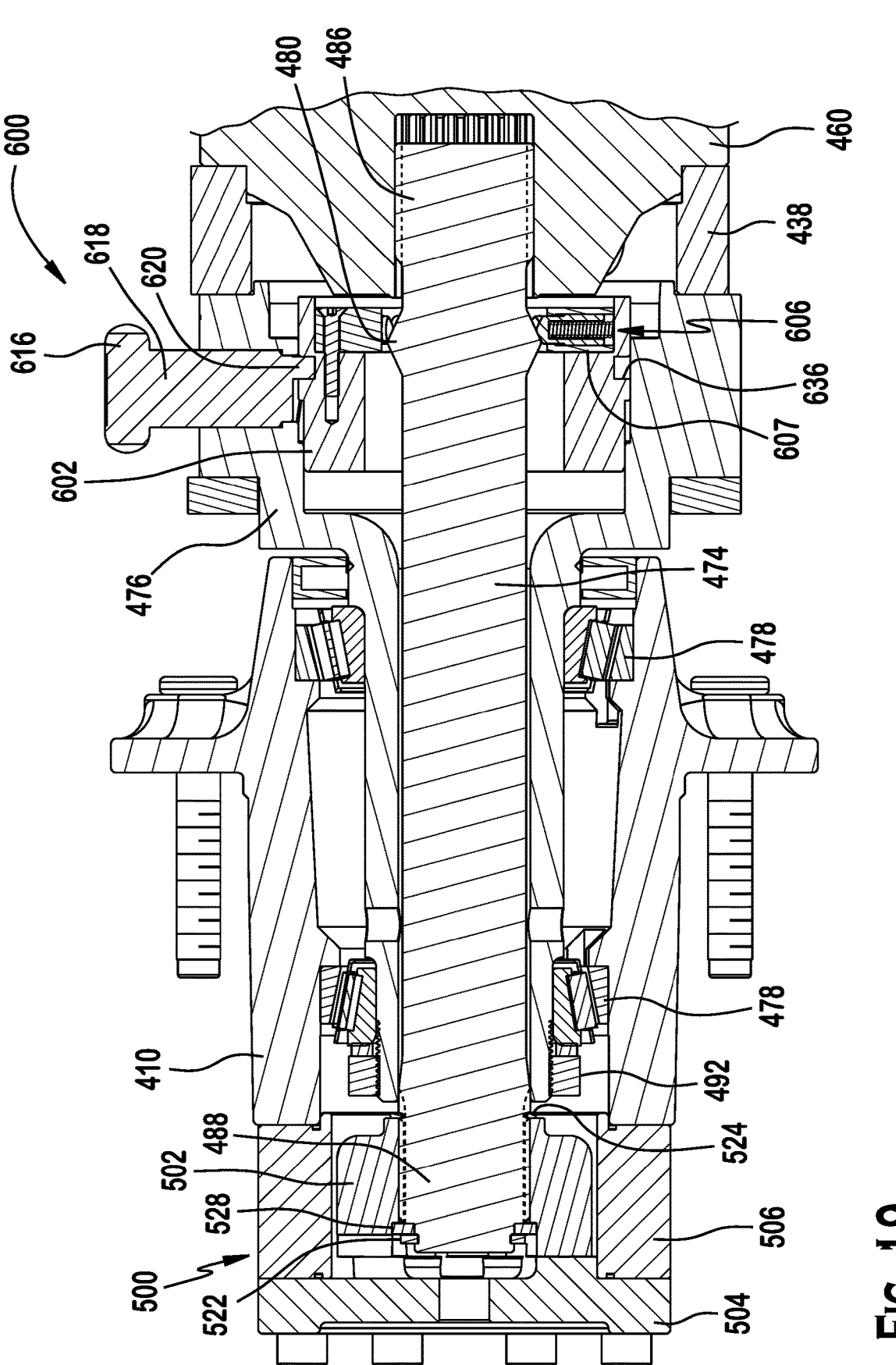
FIG. 19 depicts a cross-section view of an embodiment of a manually controlled locking assembly and driveshaft with the locking assembly in a locked configuration, and with the driveshaft urged to the left, but unable to shift due to interference of the clutch components.
Figure 20:
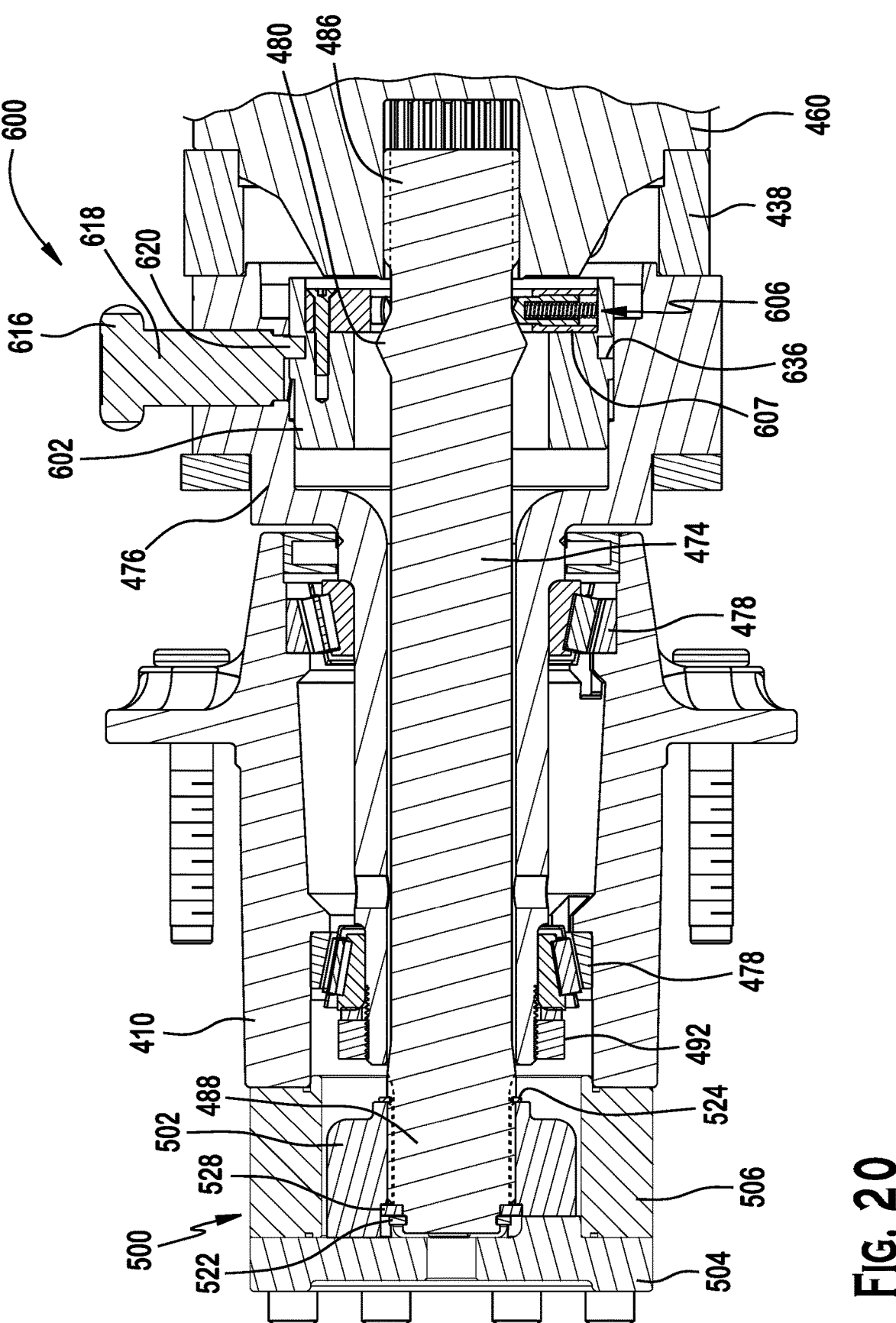
FIG. 20 depicts a cross-section view of a manually controlled locking assembly and driveshaft with the locking assembly in a locked configuration, and with the driveshaft urged to the left, and having been shifted to engage the clutch assembly.

As depicted in FIGS. 19-22, the sequence for transitioning the locking assembly 600 and the driveshaft between and engaged and disengaged state will be discussed. As depicted in FIG. 19, the knob 616 or any suitable handle, has been rotated to move the pushing member 602 along the longitudinal axis of the driveshaft 474, and thus having moved the urging member 606 from being positioned to the left of the apex 482, to a position on the right side of the apex 482. The greatest amount of compression of the biasing devices 610, shown in cross-section view of FIG. 18, occurs as the urging member 606 crests over the apex 482, passing from the left bearing surface 484, and into the position depicted in FIG. 19, with the plungers 608 positioned at the top of the bearing surface 484 positioned just to the right of the apex 482. The plungers 608, with the movement of the urging member 606 to be positioned pressing against the bearing surface 484, now on the right side of the apex 482 of the annular protrusion 480, are thus applying an urging force against the right side bearing surface 484 of the protrusion 480 and thereby applying an urging force to move the driveshaft 474 to the left. Once the clutch assembly 500 is in a state that allows the clutch to become engaged, the driveshaft will be shifted to the left, as shown in FIG. 20.

Thus, with the locking assembly 600 moved to the locking position, the urging member 606 is initially moved to the locking position, and when the driveshaft 474 can respond to the urging, as shown in FIG. 20, would be urged to the left as the plungers 608 ride down the right bearing surface 484, pushing the driveshaft to the left, where the clutch assembly 500 is to become engaged. As shown in FIG. 20, the engaged position of the clutch assembly 500 would be characterized when the driveshaft 474 is laterally shifted to the left, and the plungers of the urging member 606 are positioned at or near the transition point of the right bearing surface 484 to the nominal diameter 475 of the driveshaft 474. Though it is recognized the shifting of the driveshaft into the engaged position can only occur once the clutch assembly 500 is in a state that allows the teeth of the driving clutch element 502 to enter into locking engagement with the teeth of the driven clutch element 504, whereupon the driveshaft 474 will be capable of being shifted towards the locking direction in response to the urging force applied by the urging member 606, and the plungers are caused to slide down the bearing surface of the annular protrusion 480. The ramped surfaces of the annular protrusion thus serve as bearing surfaces, where the plungers 608 are urged against the bearing surface 484 by the biasing devices 610 retained within the collar 607. The force applied by the plungers against the bearing surface of the annular protrusion 480 on the driveshaft 474, once the plungers are positioned to the right of the apex 482, would then urge the driveshaft 474 to shift laterally in response to the collective pressure applied through all of the plungers 608 of the urging member 606. Thus, once the pushing member is pushed to the right by controlled actuation (whether by manual operation, or hydraulic as shown in FIGS. 23-26), the urging member 606 is then also pushed to the right, caused to crest over the apex 482 of the protrusion 480 on the driveshaft 474, whereupon continued inward pressure by the plungers 608 bearing down on the right side bearing surface of the annular protrusion 480 would result in the driveshaft 474 being urged to shift laterally (as shown, in the leftwards direction). The shifting of the driveshaft laterally, once permitted by the clutch assembly, will cause the driveshaft 474 to be urged towards the locking position, such that the clutch assembly 500 becomes engaged for transmitting motive force applied to the drive shaft through to the wheel.

Figure 21:
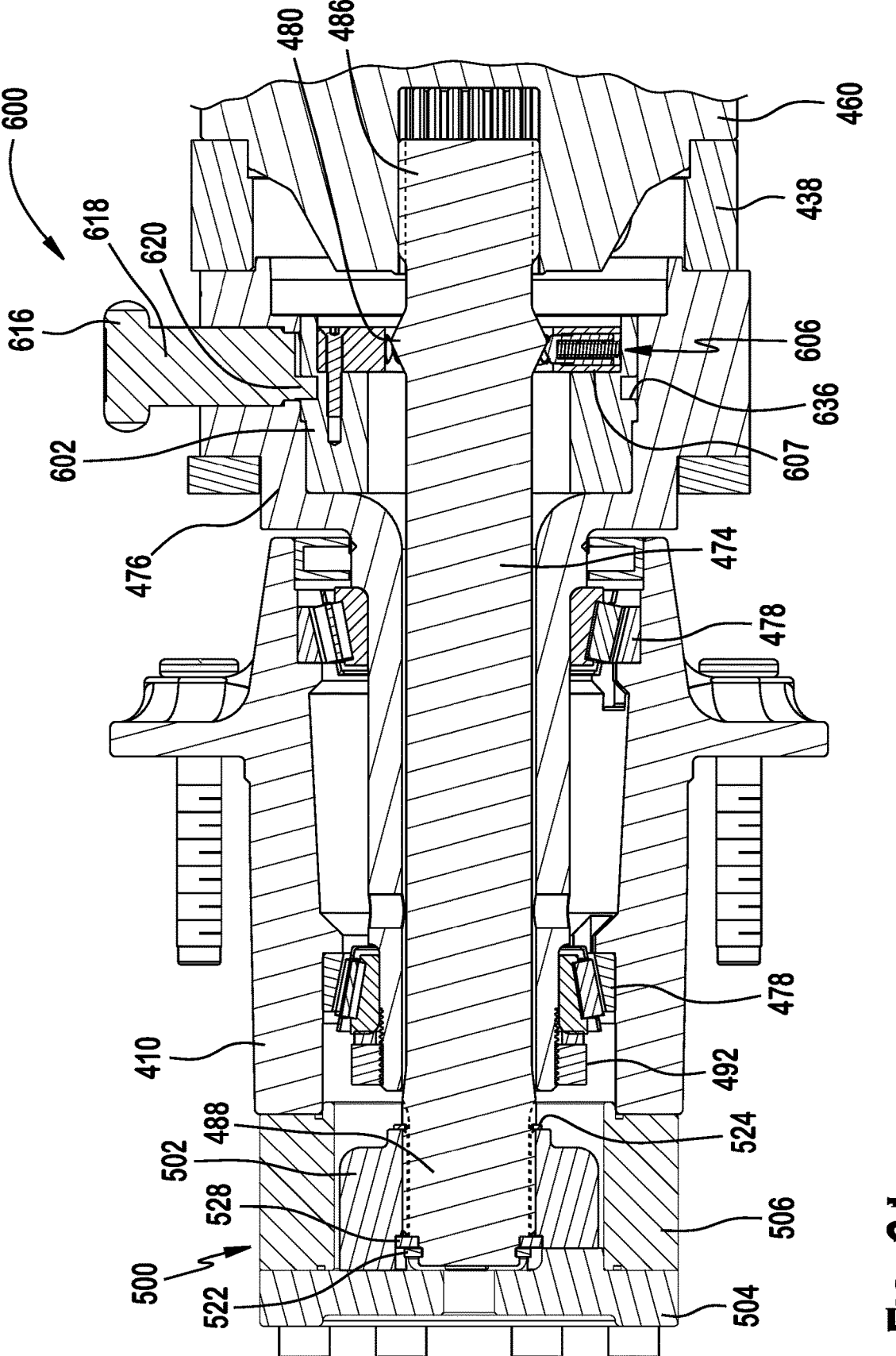
FIG. 21 depicts a cross-section view of a manually controlled locking assembly and driveshaft with the locking assembly in an unlocked configuration, and with the driveshaft urged to the right, but not shifting due to restraining force by the engaged clutch components.

In reversing the actuation of the locking assembly 600, now with reference to FIG. 21, the knob 616 may be rotated to place the pin in the opposite position, urging the pushing member 602 and the urging member 606, towards the left.

Figure 22:
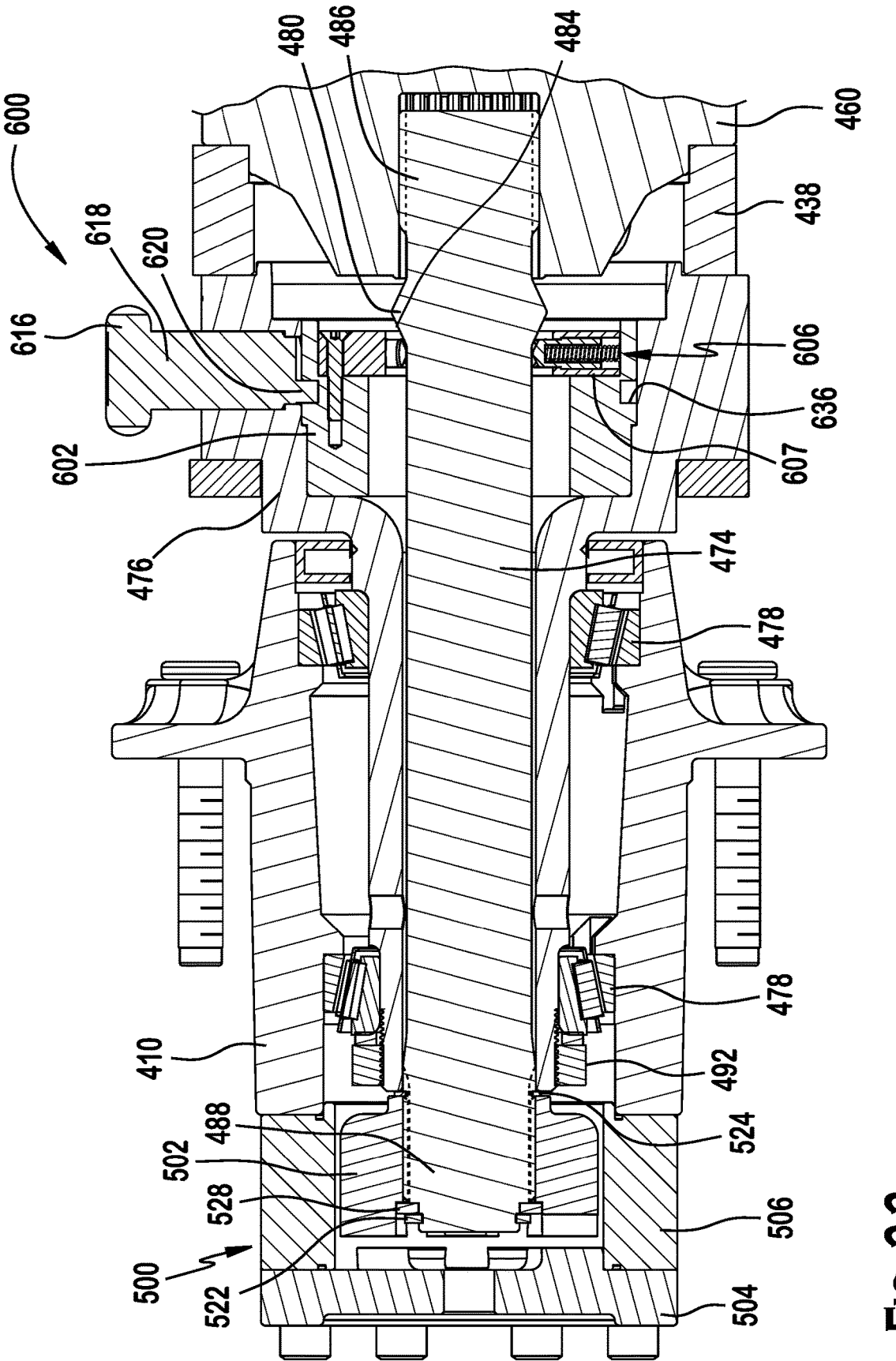
FIG. 22 depicts a cross-section view of a manually controlled locking assembly and driveshaft with the locking assembly in an unlocked configuration, and with the driveshaft urged to the right, and having been shifted to disengage the clutch assembly.

The urging member as it is moved will cause the plungers to slide laterally over the surface of the driveshaft 474, now in a direction from right to left. The urging member 606 would be caused to pass over the apex 482 of the annular protrusion 480 provided on the driveshaft 474. In passing over the apex, the plungers 608 would again be forced outwards and retract into the collar 607, compressing biasing devices 610 as the plungers ride up the ramped surface of the bearing surface 484. The greatest amount of compression in the biasing devices 610 is created as the plungers 608 collectively crest past the apex 482 of the annular protrusion 480, then are positioned against the bearing surface 484 on the left side of the apex 482, as depicted in FIG. 21, and now applying an urging force against the driveshaft 474 to move to the right and towards the disengaged position. As before, actual shifting of the driveshaft may not occur until the clutch assembly is unweighted, whereupon the components of the clutch assembly 500 can disengage, so as to not transmit motive forces therethrough. As shown in FIG. 21, the driveshaft 474 may be urged to the right, but may not necessarily become effective immediately in shifting the driveshaft. Only once the clutch assembly 500 is free from torque transmission, then the driveshaft 474 may shift rightwards to the disengaged position. The disengaged position is depicted in FIG. 22 and would be characterized by the state when the driveshaft 474 has been laterally shifted to the right. This may occur only so long as the clutch assembly 500 is in a state that allows the teeth of the driving clutch element 502 to escape out of locking engagement with the teeth of the driven clutch element 504. At this point, with the clutch unloaded and not transmitting torque through the clutch assembly, then the driveshaft 474 will be allowed to start to shift towards the disengaged direction, as the plungers 608 are urged against, and caused to slide down the left bearing surface 484 of the annular protrusion 480 on the left side of the apex 482 of the protrusion 480. The ramped surfaces of the annular protrusion 480 serve as bearing surfaces 484, where the plungers 608 are urged against the bearing surface by the biasing devices 610 retained within the collar 607. The force applied by the plungers 608 against the bearing surface 484 of the annular protrusion 480 on the driveshaft 474, once the urging member 606 is positioned to the left of the peak, would then urge the driveshaft 474 to shift laterally to the right in response to the collective pressure applied through all of the plungers 608 of the urging member 606. Thus, once the pushing member is pushed to the left by controlled actuation (whether manual operation, or alternatively by hydraulic or other alternative actuation method), the urging member 606 is then pushed to the left, crested over the peak of the protrusion 480 on the driveshaft 474, such that continued inward pressure by the plungers 608 bearing down on the left side bearing surface 484 of the annular protrusion 480, would result in the driveshaft 474 being urged to shift laterally (as shown, in the rightwards direction) to cause the driveshaft 474 to be urged towards the disengaged position, characterized by the clutch assembly 500 being disengaged for allowing the wheel hub 410 to free wheel, relative to the driveshaft 474.

With reference to FIGS. 19 and 21, the plungers 608 are shown urging against a respective bearing surface 484, pushing against the sloped surface on a respective side of the apex 482 of the annular protrusion 480, and thereby creating a net urging force to the driveshaft 474, urging the driveshaft to shift laterally. Notably, the operation of the locking assembly 600, in applying merely an urging force against the bearing surface 484 of the driveshaft 474 in either direction, will be subservient to the relative positions and forces applied through the clutch assembly 500 in determining when the lateral movement of the driveshaft will occur. That is, the driveshaft may be urged in a respective direction through the operational control of the locking assembly 600 as has been described above, however, the shifting movement of the driveshaft 474 does not occur until the time that the elements 502, 504 of the clutch assembly 500 are positioned such that they are physically capable of being moved laterally to engage or disengage, as appropriate. Thus, the proper positioning of the components 502, 504 of the clutch assembly 500 becomes a necessary condition for allowing the urging force applied to the driveshaft 474 through the locking assembly 600 to become effective. The necessary condition for transitioning the clutch assembly 500 between an engaged and disengaged state is then determinative of when the applied urging force directed against the bearing surface 484 of the driveshaft 474 can be made effective.

So long as the clutch assembly 500 is not in a position for shifting between the engaged and disengaged state, then the urging force applied to the driveshaft 474 (as depicted in FIGS. 19 and 21) through the actuation of the locking assembly 600 will remain applied, in that the plungers 608 will continue to push against the respective bearing surface 484 on the annular protrusion 480, until the clutch assembly 500 allows the driveshaft 474 to be shifted. At that point, the plungers 608 bearing down the bearing surface of the protrusion 480, cause the driveshaft 474 to be shifted laterally. Once the driveshaft 474 is fully shifted in one direction (as depicted in FIGS. 20 and 22), the plungers 608 will be positioned applying none or only minimal force against the bearing surface at the respective end extent of the annular protrusion 480, with the plungers 608 positioned near the transition point between the protrusion 480 to the body of the driveshaft 474.

Factors for allowing the shifting of the clutch between engaged and disengaged, when urged to do so by the locking assembly 600, include the extent to which torque remains applied through the clutch assembly 500 (preventing disengagement), and/or the physical location of the teeth of the clutch components 502, 504 that might interfere with engagement of the teeth of the clutch components. For example, the clutch assembly 500 may only become disengaged when the magnitude of torque force being directed through the clutch assembly 500 is substantially none, such that the urging force from the locking mechanism 600 can overcome restraining force in the clutch from the dovetail arrangement of the teeth, or even friction between opposing teeth surfaces against each other, that seeks to keep the clutch assembly engaged. Once the disengaging force from the urging member 606 acting upon the driveshaft bearing surfaces 484 exceeds the restraining force of the teeth of the clutch assembly 500, then the driveshaft 474 may shift along its longitudinal axis, in order to allow disengagement of the clutch assembly 500. In the reverse operation, in order to allow engagement of the clutch assembly 500, the teeth of the clutch components 502, 504 must be properly positioned at a point where lateral movement of the driving clutch element 502 is possible, and the teeth of the driving clutch element 502 can be fitted into the space between teeth of the driven clutch element 504, to allow engagement of the clutch assembly 500.

Thus, when the clutch assembly 500 is capable of being engaged or disengaged becomes a necessary condition that is the dominant factor in determining whether an urging force by the locking assembly 600 acting against a bearing surface 484 of the driveshaft 474 will become effective or remain applied as a static force, in order to cause the lateral movement of the driveshaft 474 at the urging of the locking assembly 600.

A benefit of the operation of the locking mechanism 600 described herein is that the locking mechanism can be actuated to cause the urging member 606 to be controllably moved between a first urging position and a second urging position (characterized by being positioned on either side of the apex 482 of the annular protrusion 480), and is thus configured to apply a biasing force to the driveshaft 474 through the plungers 608 acting upon the bearing surfaces 484 of the driveshaft 474, such that the driveshaft would be merely urged into either a first position (e.g. a locked position), or a second position (e.g. an unlocked position). However, the movement of the driveshaft 474 is only possible (where the urging force becomes effective) when the condition of the clutch assembly 500 components 502, 504 allows the lateral shifting movement of the driveshaft 474 as described above. That is, the condition of the clutch components 502, 504 becomes a dominant factor in determining whether the driveshaft 474 will shift one way or the other, when there is urging applied to the driveshaft 474 through operation of the control assembly 600. In this manner, the locking mechanism may be actuated or controlled by the user, however, the actual engagement or disengagement of the driveline will not occur until it is safe for the transition to happen. For example, if the teeth of the clutch assembly components 502, 504 are positioned such that there is lateral interference between the teeth moving into rotational engagement, for example, such as when the opposing teeth of the clutch assembly components are overlapping when viewed along the axis of the driveshaft, then the driveshaft 474 remains unable to shift into a locking position, and even if urged to do so by the operation of the locking assembly. The driveshaft 474 will not move laterally into the locking position until such time as the teeth are no longer interfering with and preventing the driveshaft 474 movement needed to engage the components 502, 504 of the clutch assembly 500, e.g., where the wheel has been rotated to position the teeth of the driven clutch element out of interference, and are free to enter into rotational interference with the teeth of the driving clutch element. Similarly, if the clutch assembly 500 is already engaged and transmitting rotational force between the power source and the wheel (or vice versa), the shape of the teeth being slightly undercut and presenting a dovetail profile, will tend to keep the clutch assembly 500 engaged, despite the operation of the locking assembly 600 being moved into a disengaging position, where the driveshaft is urged laterally into a disengaged state. In this state, despite the urging applied to the driveshaft 474 by the urging member 606 to shift towards the disengaged position, the disengagement of the components 502, 504 of the clutch assembly 500 is only made possible when there is no torque being transmitted through the clutch assembly 500, either from the motor to the wheels, or from the wheels to the motor, such that the clutch assembly 500 is free from transmitting any torque force. Only then will the urging forces applied through the locking assembly 600 become effective to shift the driveshaft 474 laterally and cause the disengagement of the clutch components 502, 504 of the clutch assembly 500.

This configuration may be helpful for example, when the trailer 1 is operated in self-propelled mode on a sloped surface. Safely converting the trailer 1 to towing operation (not self-propelled mode) may require unweighting the clutch assembly and/or shifting of the wheel assemblies, as has been described, as well actuation of the locking assembly 600 into the unlocked state.

In an exemplary application, the various embodiments of the locking assembly 600 described herein providing merely an urging force to the driveshaft 474 for engaging or disengaging of the clutch assembly 500 may be useful in a situation where the trailer 1 is operated in self-propelled mode and has been parked on a non-level surface. In such an instance, the clutch assembly 500 of the trailer 1 is provided in a mode that is engaged for self-propelled movement. When desired to convert from self-propelled mode to the tow-behind mode, the user may actuate the locking assembly 600 of the wheel hub assemblies 402, in order to have the urging member 606 moved, as described above, to apply an urging disengaging force to the driveshaft 474 in order to disengage the clutch assembly 500. However, with the weight of the trailer being transmitted through the driveline to one or more of the wheels, on the non-level surface, the engaged driveline would serve to prevent freewheeling of one or more of the wheel hubs 410. It is not until the clutch of each respective wheel hub assembly 402 is no longer transmitting torque forces through the clutch assembly 500 that the disengagement of the driveline would be allowed to occur. Thus, when the weight of the trailer 1 is taken off the driveline of each of the wheel hub assemblies 402, and is instead taken up by the tow vehicle then any of the clutch assemblies 500 that remained under driveline tension would become disengaged and allow the trailer to be towed away with the wheel hub assemblies 402 capable of freewheeling.

Similarly, so long as the driveshaft 474 of each wheel hub assembly 402 of the trailer 1 remains urged into the disengaged state by the positioning of the urging member as shown in FIG. 9, then the driveshaft 474 would remain urged in a direction that prevents clutch engagement. It is only when the locking mechanism is actuated, and the urging member shifted to the other side of the protrusion 480 that the driveshaft 474 would be urged to have the clutch assembly for each of the wheels engaged. Moreover, the shifting of the driveshaft would not occur until the wheels are static, and positioned such that the teeth of the respective clutch elements are aligned properly for lateral engagement into a position where they will enter into rotational interference (i.e., the clutch engaged) for transmitting drive forces through the drive line.

The distance that the driveshaft 474 will shift between the engaged state and the disengaged state is equivalent to the distance measured between the transition point on either side of the annular protrusion 480, as each of the bearing surfaces transition to the nominal diameter of the driveshaft. As the driven clutch element is fixed to the power output end 488 of the driveshaft 474, the distance that the driven clutch element 502 will shift, in order to move between the engaged clutch and disengaged clutch assembly, or vice versa, will also be the same as the measured distance between each of the transition points present on either side of the annular protrusion 480.

It is contemplated that adjustment to the magnitude of the urging force can be made by varying one or more of: the number of plungers acting upon the bearing surfaces, the cumulative inward biasing force applied by all of the biasing devices pushing the plungers towards the driveshaft; and the steepness of the angled surface provided as the bearing surfaces of the annular protrusion. For example, a relatively greater magnitude of urging force through the operation of the locking assembly 600 is created with one or more of: increased biasing device force (e.g., spring rate), increased number of plungers each urged inwards by a biasing device;

and increased steepness of the angle of the bearing surface, relative to the longitudinal axis of the driveshaft. Conversely, a lesser urging force through the operation of the locking assembly 600 can be achieved by one or more of: decreasing the biasing device forces, such as by reducing the spring rate; decreasing the number of plungers; or providing a shallower angle to the bearing surface that the plungers are being urged against. It is contemplated that the annular protrusion 480 need not necessarily be symmetrical, and thus it is contemplated that by varying the angle of the surface for each of the bearing surfaces 484, the urging force acting upon the driveshaft 474 may be unequal depending on the direction of the urging force being applied against the driveshaft bearing surface. Thus, one may control the relative magnitude of force applied through the locking assembly 600, for independently urging each of the engagement or disengagement of the clutch assembly 500, using the teachings herein.

It is contemplated that the locking mechanism 600 may be controlled through any suitable actuation method, including manual action (e.g., lever operated) as shown in the embodiment of FIG. 21, or actuated movement, such as hydraulic, or pneumatic operation, such as is shown in the embodiment of the locking assembly 600' of FIG. 23, and discussed below. One skilled in the art will also recognize that electronic control e.g., solenoid actuation, or electromechanical or servo actuators may be similarly provided to cause the pushing member 602 to be reciprocated within the locking assembly and thus operate in a manner similar to the locking assembly embodiments described herein. Any of these control methods may be utilized to directly control the reciprocating movement of pushing member 602 or 602', which is secured to the urging member 606. The pushing member 602 or 602' may be in the form of a piston element.

Figures 23, 24:
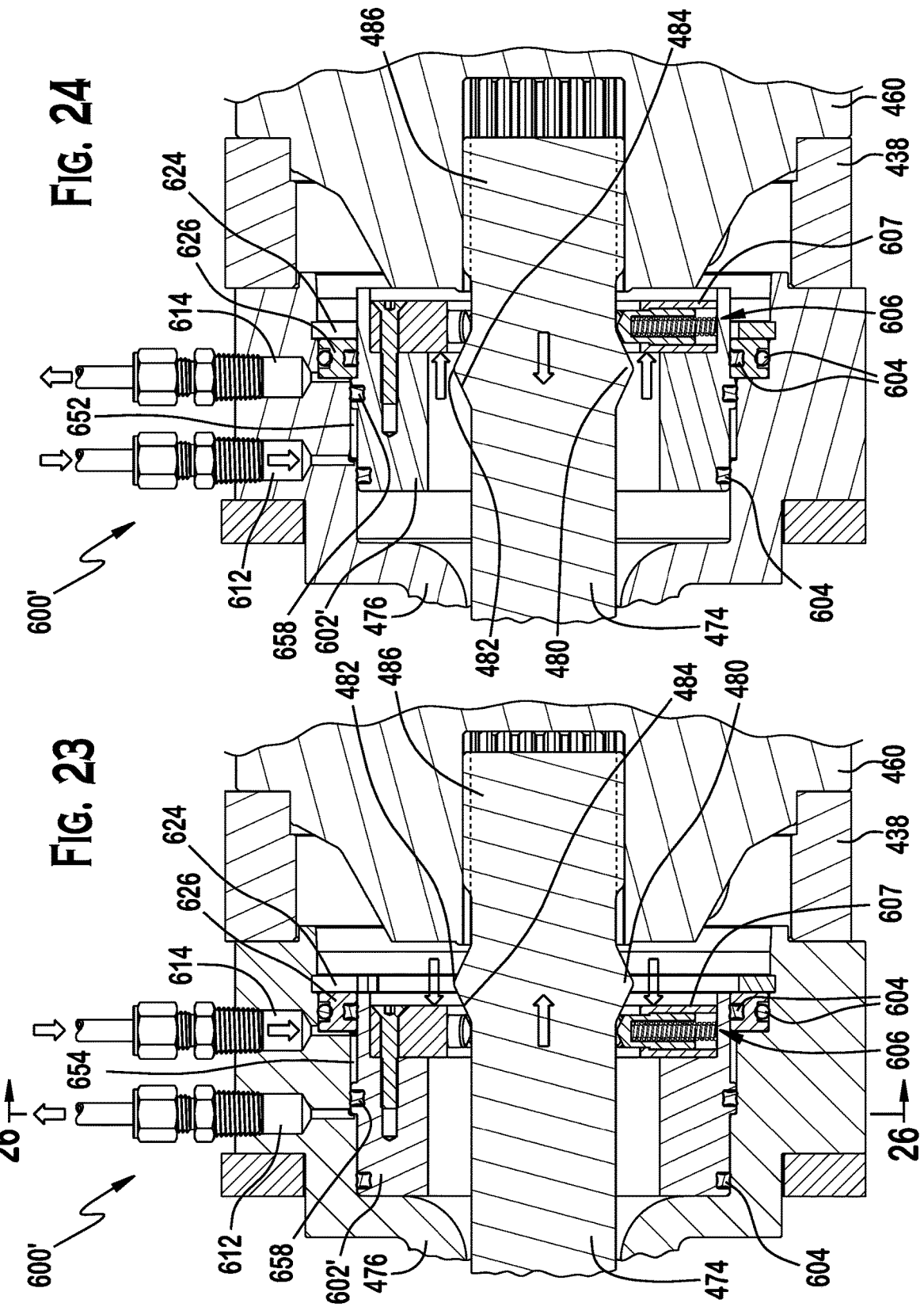
FIG. 23 depicts a cross-section view of an embodiment of a pressure controlled locking assembly and driveshaft, with the locking assembly in an unlocked configuration.
FIG. 24 depicts a cross-section view of the pressure controlled locking assembly and driveshaft of FIG. 23, only now provided in a locked configuration.
Figure 25:
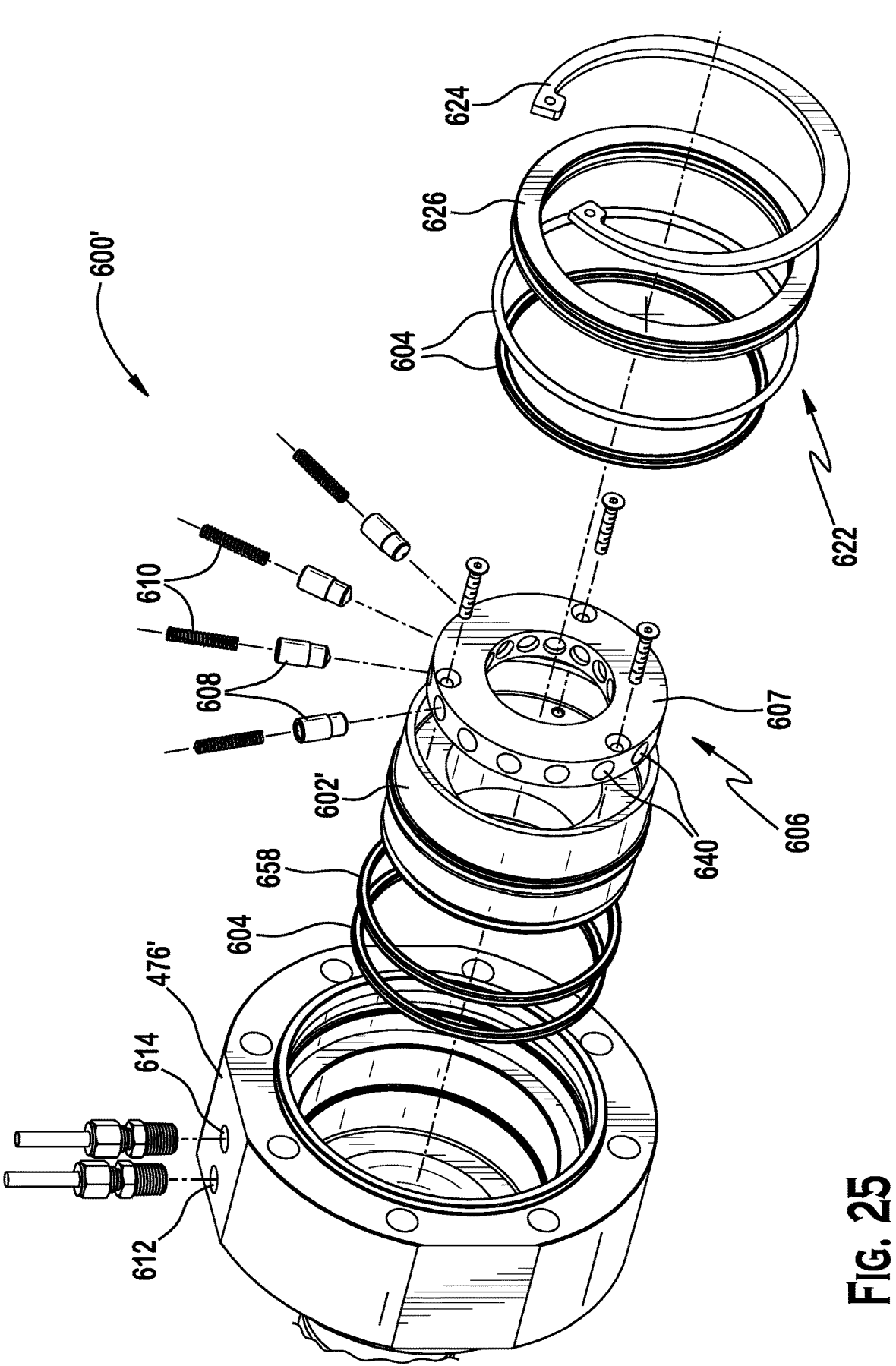
FIG. 25 is a partially exploded view of components of the pressure controlled locking assembly.
Figure 26:
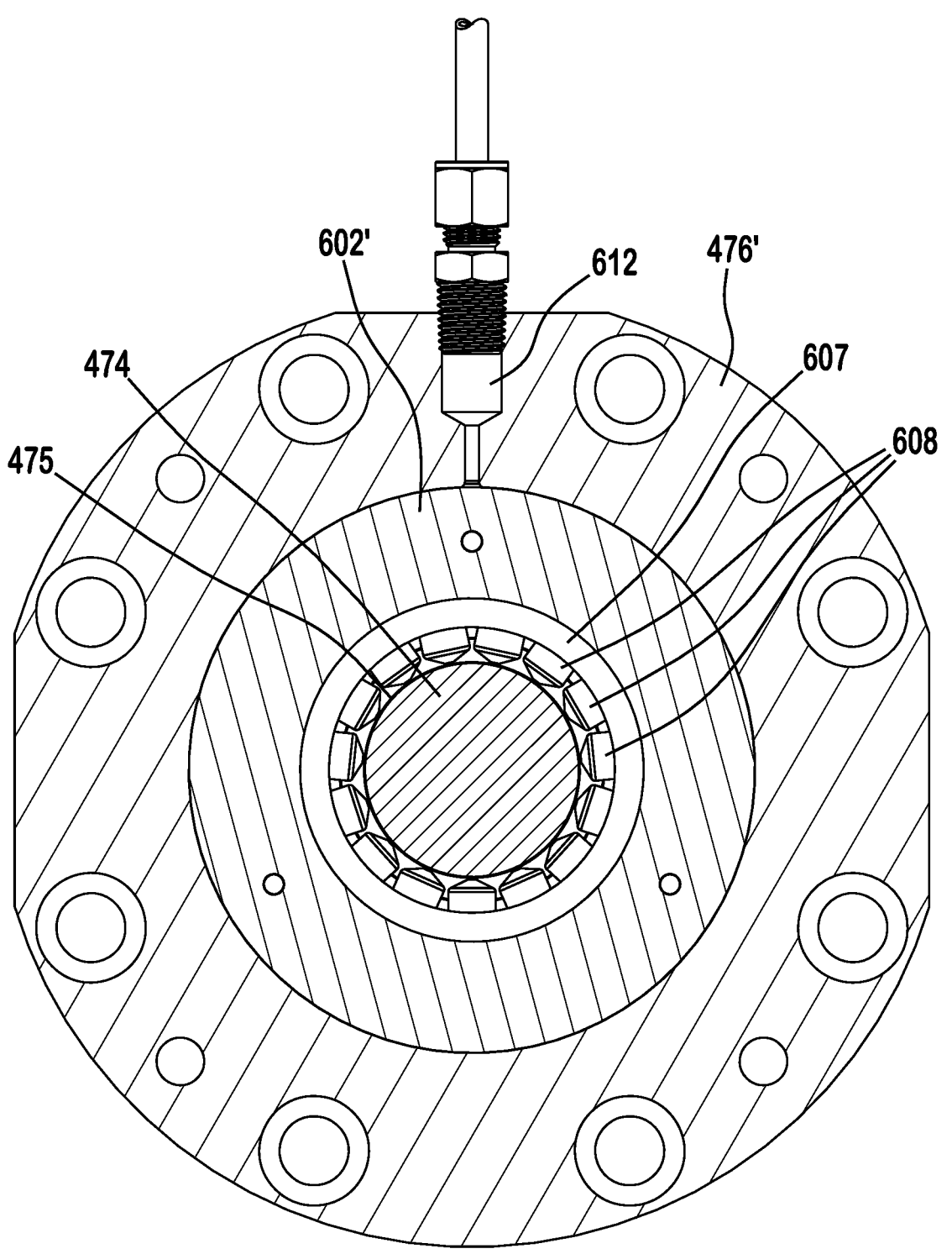
FIG. 26 is a cross-section view of the locking assembly of FIG. 23, taken through the plane along line 26-26.

In the embodiment depicted of the alternative locking mechanism 600' depicted in FIG. 23, the pushing member 602' is actuated by pressure differentials created within chambers alongside the pushing member 602. The actuation will be described with reference to hydraulic actuation, thought it contemplated that one skilled in the art will recognize that a pneumatic pressure system would perform similarly, where the movement of the pushing member 602' is controlled directly by the introduction of gas pressure. The system for actuating the locking mechanism may utilize the same power source previously described as providing for various actions of the trailer, such as steering, motive force, and movement of the actuators for the storage bin or platform.

Hydraulic or Pneumatic Locking Assembly

With reference to FIGS. 23-26, details of another embodiment of the locking assembly 600' utilizing pressure differentials to control the locking assembly actuation will be discussed. The locking mechanism 600' performs a similar function and in a similar sequence of operations as the locking mechanism 600 previously described, only with the actuation of the components within the locking mechanism 600' being controlled by selectively manipulating the pressures that act upon the pushing member 602', as an alternative to the operation by manual rotation of a knob 616 as previously described. The effect of locking assembly 600' in operation will be identical to that previously described, only with the movement of the pushing member 602' and urging member 606 being actuated to selectively apply urging forces upon the driveshaft 474 by a user operating a control system that selectively manipulates pressures in a system to place the locking assembly 600' into a locked or unlocked configuration. The locking mechanism 600', as shown in FIG. 23, and in exploded view of FIG. 25, may be positioned near the open bell end of the bell housing 476, and includes at least the following major components: pushing member 602', urging member 606 and retainer assembly 622. The urging member 606 is as previously described, fitting within a recess 632 of the pushing member 602', and functions similarly in applying an urging force to bearing surfaces 484 of a protrusion 480 provided on the driveshaft 474, as the urging member 606 is positioned relative to the driveshaft 474.

As before, the pushing member 602' of the alternative locking assembly 600' has a generally annular shape and encircles the driveshaft 474. The pushing member 602' is fitted within open, bell-end of the bell housing 476'. The cross-section profile of the pushing member 602' is depicted in the cross-section views of the locking assembly 600' depicted in FIGS. 23 and 24. As shown, the pushing member 602' provides a recess 632 that can receive the urging member 606 therein, such that the urging member can be secured against the pushing member when fitted within the recess through the use of one or more fasteners. The pushing member 602' is configured to operate as a reciprocating piston that encircles a portion of the driveshaft 474 passing through the bell housing 476'. The pushing member 602' is thus configured to translate axially (in a direction parallel to the longitudinal axis of the driveshaft 474). As can be seen with reference to FIGS. 23 and 24, the pushing member 602' in cross-section appears to travel laterally between a first position as shown in FIG. 24, and a second position as shown in FIG. 23. Axial translation of the pushing member 602 may be achieved by any suitable actuation method, including mechanical control, electromechanical, pneumatic, or hydraulic control. As shown in FIGS. 23-26, control of the pushing member 602' may be actuated by varying the pressure in chambers surrounding the pushing member 602', each chamber being provided on opposing sides of a medial seal 658. In this embodiment, the pushing member 602' is moved by introduction of fluid pressure through one of first port 612, or second port 614, while allowing release of pressure out the other port, such that a user may direct the lateral movement of the pushing member 602' between the positions depicted in FIGS. 23 and 24.

The axial movement of the pushing member in the direction depicted in FIG. 23 is limited by the bell housing 476', where the inside surface provides a hard stop to the extent of travel of the pushing member 602'. With reference to FIG. 24, axial movement of the pushing member 602' is limited in the directions shown by the presence of a retaining assembly 622.

The retaining assembly 622 provides at least a retainer ring 624, that can be fitted into a groove in the bell housing 476. The retainer assembly 622 may also provide a collar seal 626 and may include one or more seals 604. The retainer assembly 622 provides a stop to the limit the extent of travel of the pushing member 602' and urging member 606, in the direction depicted in FIG. 24. In an embodiment, the retainer ring 624 may be provided as a snap-ring. C-clip, E-clip, or other retaining ring forms that will be familiar to those of skill in the art. The retainer ring 624, once fitted into a groove provided in the interior surface of the bell housing 476, provides a shoulder that limits the travel of the pushing member 602' and urging member 606, as it is mechanically secured to the pushing member 602'. Additionally, the retainer assembly 622 having a collar seal 626, such as that depicted in FIG. 25, and shown positioned in FIGS. 23 and 24, may provide a leak proof chamber for pressure control of the pushing member 602', as will be discussed.

For the alternative embodiment of the locking assembly 602', as shown in FIGS. 23-26, the pushing member 602' is axially translated by controlling pressures in distinct chambers in contact with the pushing member, as will be discussed. Where the pushing member 602' is actuated by pneumatic or hydraulic actuation, the pushing member may be provided with one or more seals 604 provided at the interface of the pushing member 602', the bell housing 476', and at the interface of the collar seal 626 with the bell housing 476' and pushing member 602'. These seals 604 may be provided as scaling annular ring components that are fitted into retaining grooves, as will be familiar to those of ordinary skill in the art and can serve to retain fluid pressures contained within the respective chambers 652,654. In an embodiment, the seals 604 may be O-rings or other elastomeric seals that are mounted on the body of the pushing member and may partially reside within grooves provided on the pushing member 602'. The seals 604 provide sealing to the chambers around portions of the pushing member 602' and accommodate sliding movement of the pushing member 602 within the bell housing 476. As depicted in the embodiment of FIGS. 23-26, the pushing member 602' may be provided with a medial seal 658 that separates the first chamber 652 from the second chamber 654. Additionally, seals 604 may be provided, specifically against sealing collar 626, in order to provide a sealed chamber for pressure actuation of the pushing member 602'.

With reference to FIGS. 23 and 24, the operation of a second embodiment of the locking assembly 600' is shown. As shown in FIG. 24, pressurized fluid may be introduced in the form of hydraulic fluid directed from a fluid reservoir source and into the first port 612, which is in fluid communication with the first chamber 652. The first port 612 is depicted in FIG. 24 as the leftmost port, and feeds into the first chamber 652, which is shown positioned to the left of the medial seal 658. The second chamber 654 is in fluid communication with the second port 614. Simultaneously with the introduction of fluid pressure into the first chamber 652, fluid may escape or pressure may be released out the second port 614, as pressure is relieved from the second chamber 654, shown positioned to the right of the medial seal 658. The increased pressure in the first chamber 652, once elevated above that in the second chamber 654, will then urge the pushing member 602' in a first direction, shown in FIG. 24 as being to the right. The movement of the pushing member 602' will also move the urging member 606 to the right and may travel until the urging member 606 is restricted from further movement against the retainer assembly 622, as depicted in FIG. 24. Movement of the urging member 606 in either direction, for example, as depicted towards the right, will cause the plungers 608 to travel laterally over the surface of the driveshaft 474, and will place the plungers in a position bearing down against the right side bearing surface 484 of the driveshaft 474. Assuming that the clutch assembly 500 is in a position that allows the driveshaft 474 to be capable of laterally shifting, collective pressure from each of the plungers 608 of the urging member 606 would bear down on the right bearing surface 484, and urging the driveshaft 474 to shift to the left as the plungers 608 ride down the bearing surface, until the drive shaft is fully shifted, characterized by the plungers being positioned at the transition point on the driveshaft 474 where the bearing surface 484 transitions to the nominal driveshaft circumference 475, as depicted in FIG. 24, and in axial cross-section view in FIG. 26.

Reversal of the pushing member 602' movement may be accomplished by directing pressurized fluid into the second port 614, to pressurize the second chamber 654, and allowing the relief of pressurized fluid from the first chamber 652, out through the second port 614. Accordingly, the pushing member 602' would be urged is a second direction, shown in FIG. 23 as being to the left. The movement of the pushing member 602' will also move the urging member 606 to the left and may travel until the pushing member 602' is in contact with the bell housing 476', as depicted in FIG. 23. Movement of the urging member 606 in a direction, for example, as depicted towards the left, will cause the plungers 608 to travel laterally over the surface of the driveshaft 474, and will place the plungers 608 in a position bearing down against the left side bearing surface 484 of the driveshaft 474. Assuming that the clutch assembly 500 is in a position that allows the driveshaft 474 to be capable of laterally shifting, collective pressure from each of the plungers 608 of the urging assembly 606 would bear down on the left bearing surface 484, and urging the driveshaft 474 to shift to the right as the plungers 608 ride down the bearing surface, until the drive shaft is fully shifted, characterized by the plungers being positioned at the transition point on the driveshaft 474 where the bearing surface 484 transitions to the nominal driveshaft diameter 475, as depicted in FIG. 23, and in axial cross-section view in FIG. 26.

In this manner, the pushing member 602' can be caused to reciprocate within the bell housing 476', with the movement of the pushing member 602' selectively being controlled by a user directing the movement of pressurized fluid into the respective chambers 652,654.

Similar to the manner described before with regard to the locking assembly 600, the urging member 606 of the locking assembly 600' would be caused to move and apply and urging force to each of the respective bearing surfaces 484. Thus, with regard to the FIG. 24, the urging member 606 is positioned with the plungers 608 bearing down on the right side bearing surface 484, to urge the driveshaft 474 to shift laterally to the left, in order to cause the engagement of the clutch assembly 500 when the lateral shifting is possible. Similarly, with regard to the FIG. 23, the urging member 606 is positioned with the plungers 608 bearing down on the left side bearing surface 484, to urge the driveshaft 474 to shift laterally to the right, in order to cause the disengagement of the clutch assembly 500 when the lateral shifting is possible.

Further aspects concerning the movement and operation of the locking assembly 600 and 600' will be described. As the urging member 606 is shifted by the respective pushing member 602, 602', the urging member will pass over the annular protrusion 480, such that the plungers 608 would be forced outwards and at least partly into the recess openings 640 in the collar 607, compressing the biasing devices 610, as the plungers 608 are caused to ride up one of the ramped bearing surfaces 484.

As noted previously with regard to the locking assembly 600, the urging force applied by the urging member 606 of the locking assembly 600', when the pushing member 602' is reciprocated to have the urging member 606 selectively positioned on either side of the apex 482 of the annular protrusion 480 of the driveshaft 474 applies merely an urging force to the driveshaft. Actual shifting movement of the driveshaft 474 will not occur until the necessary conditions previously described are met for engagement or disengagement of the clutch assembly 500, thus the urging force of urging member 606, regardless of mode of control of the locking assembly 600, 600' remains subservient to the necessary conditions of the clutch components 502, 504 that are determinative of when the application of the urging upon the driveshaft 474 will become effective. Thus, the teachings regarding the performance of the locking assembly 600 are similarly applicable to the performance of the locking assembly 600', only distinction being the manner of controlling the pushing member 602, 602', and aspects related to carry out the movement of the pushing member.

It is contemplated that the teachings of self-propelled vehicles having one or more wheel assemblies with an embodiment of the selectively engageable drive system, each having at least a motor, clutch assembly and a locking mechanism configured to urge the lateral shifting of a driveshaft, using the teachings herein may be provided for use with any suitable form vehicles. For example, any of the locking assembly embodiments 600, 600' as described herein may be provided for use with wheeled vehicles capable of being self-propelled using a wheel assembly employing an engageable clutch assembly 500, such that the lateral shifting of the driveshaft 474, subject to the urging action of the locking assembly 600,600', may allow the clutch to engage or be disengaged, in the manner described previously. In another exemplary embodiment of the invention, any of the wheel assemblies, and driveline components, such as the locking mechanisms 600, 600', as taught above, may be provided for use with an alternative form of a self-propelled vehicle, such as the exemplary vehicle depicted with reference to FIGS. 27-29 and 33, where there is provided an exemplary self-propelled trailer 1" with a tricycle wheel arrangement. The trailer 1" is depicted having an extendable lifting mechanism or extension device 100. In an exemplar embodiment, the trailer 1" is provided with an extension device that is part of an extendable reach forklift, similar to those known with telescopic handlers, though it is contemplated that alternative lifting mechanisms, such as cranes, booms, or telescopic handlers, could be provided, and will be familiar to those of skill in the art. Such a self-propelled trailer 1" may operate in a self-propelled manner, using a independently powered wheel assembly for each of the rear wheels, similar to those described above, in order to selectively provide motive power to one or both of the rear wheels.

In an exemplary embodiment, the trailer 1" includes a tandem wheel assembly 300". In an exemplary embodiment of the invention, the tandem wheel assembly 300" is positioned under the undercarriage chassis 20" and generally includes a pair of rear wheel assemblies 310", and a front wheel assembly 340". As depicted, the tandem wheel assembly 300" may be in the form of a tricycle arrangement, albeit with a single front wheel, or, as shown, a set of closely mounted dual front wheels mounted on an axle and secured to the frame 10" by a pivot mount to allow the front wheel assembly to change direction. The tandem wheel assembly 300" further includes a pair of rear wheel assemblies 310", each independently powered and mounted to the frame 10".

In an embodiment, the front wheel assembly 340" may selectively be retracted, where the front wheel assembly may be raised up by pivoting rearwards to nest close to the frame 10" of the trailer 1", to allow the trailer 1" to be towed by a power vehicle, using the depicted trailer connection section, provided in the form of a trailer hitch 22" positioned and connected to a leading end of the frame 10". As depicted in FIGS. 27-30, and 33, the dual positioning of the front wheel assembly 340" is depicted. The front wheels can travel between the two positions depicted, such that the front wheels will be in either the weight bearing position, or the retracted position. When the front wheels are lowered into a weight bearing position, the front wheels will be at ground level, generally even with the rear wheels, as represented by the position of the front wheels that are positioned closest to the trailer hitch 22". When the front wheels are raised into a towing position, the front wheels will be nested against the frame 10", and relatively higher compared to the rear wheels, as represented by the position of the front wheels that are positioned against the frame 10, farthest away from the trailer hitch 22". The trailer hitch 22" includes a connector for connecting with a truck (i.e., ball mount; not shown). The front wheel assembly 340" may selectively be deployed, by being lowered relative to the frame 10" into a weight bearing position, and when the trailer 1" is removed from the tow vehicle, the front wheel assembly 340" may allow independent movement of the trailer 1" when free of the tow vehicle. In an embodiment, the front wheel assembly 340" may be steered to allow controlled directional movement of the self-propelled trailer 1". In an embodiment, the front wheel assembly 340" is pivotably mounted, as a swivel caster, to allow the front wheel to rotate in response to motive and steering forces provided by the rear wheel assemblies 310". As shown, the front wheel assembly 340" is a two wheeled swivel caster, though it is contemplated that a single wheel arrangement could be substituted. The front wheel assembly 340" may be rotatably mounted to the undercarriage chassis 20" or the frame 10", such that the front wheel assembly 340" may pivot with the movement of the self-propelled trailer 1". In such an instance, controlled movement and steering of the trailer may be achieved by operating the drive train of one or both of the rear wheel assemblies' 310". In this manner, where the drivetrains of the rear wheel assemblies 310" are operated independently or at different rates, this will provide directional steering control to the trailer 1" operating in self-propelled mode. Similarly, when the drivetrains are operated at the same rates, and synchronized together, will provide movement of the trailer 1" generally forwards or backwards. Steering adjustments in self-propelled mode can be made by altering the rate of the drive motor 470 of one rear wheel assembly 310", relative to the other.

Motive power for the self-propelled movement of the trailer 1" may thus be provided by the drive components of one or both of the rear wheels of the rear wheel assembly 310" of the trailer 1". In an embodiment, the rear wheel assembly 310", may be as shown in FIG. 33, providing a pair of rear wheels, each powered independently as distinct rear wheel assemblies 310". Each of the rear wheel assemblies 310" depicted will largely be as discussed previously. Details of each rear wheel assembly can be seen with reference to the FIGS. 31 and 32, as well as to the cross-section view of FIG. 34. As shown, there is provided a motor 460 that can be operated to cause the rotation of a driveshaft 474. The driveshaft is capable of being urged to shift laterally along its longitudinal axis using an embodiment of the locking assembly 600, 600' as has been described previously. As before, lateral shifting of the driveshaft, at the urging of the locking assembly, will cause the clutch assembly 500 to selectively engage or disengage, in order transmit power from the motor 470 through the driveshaft 474 and clutch assembly 500 to cause the powered rotation of the rear wheels, or alternatively, when the clutch assembly 500 remains disengaged, to allow the rear wheels to freewheel, as previously described. With reference to FIGS. 29-32, the motor 470 and optional transmission 460 may be mounted to a portion of the frame 10", optionally via a mounting plate 818 that is secured to the frame 10" and or the belt guard 804, which may be part of the frame 10". The motor 470 and transmission 460, if present, are then mechanically linked to the rest of the drive components by a belt drive system, shown in detail in the exploded view of FIG. 32, as well as the cross-section view of FIG. 34. The belt 808 is routed around a motor pulley 798 driven by the motor 470, optionally through a transmission 460. The belt 808 is also routed around a power input pulley 810 that is secured to the power input end 486 of the driveshaft 474, such that the driveshaft is capable of sliding laterally relative to the pully 810. The belt 808 may optionally be provided within a protective barrier, such as a belt guard 804, as is visible in FIGS. 29 and 33. The belt guard 804 may be an integral part of the frame 10" and may be as rigid structural element of the frame 10" such that it is capable of bearing loads from the wheel assembly 310". Alternatively, it is contemplated that the belt guard 804 may be an added non-structural or non-load bearing component secured to the frame 10" and generally serves to prevent entanglement with the belt drive system. The driveshaft 474, with the annular protrusion 480 is as previously described and is extended through the locking mechanism 600, 600', such that the urging member 606 within the locking mechanism may apply a selective urging force upon the driveshaft, such that it may be urged to shift laterally along its longitudinal axis, as taught with reference to FIGS. 8-26. As described previously, the urging force applied by the locking mechanism 600, 600', is merely an urging force directed by the controlled operation of the locking mechanism 600, 600', in order to engage or disengage the clutch assembly 500, subject to the clutch assembly 500 components allowing the urging force to become effective, in the manner previously described.

Figure 32:
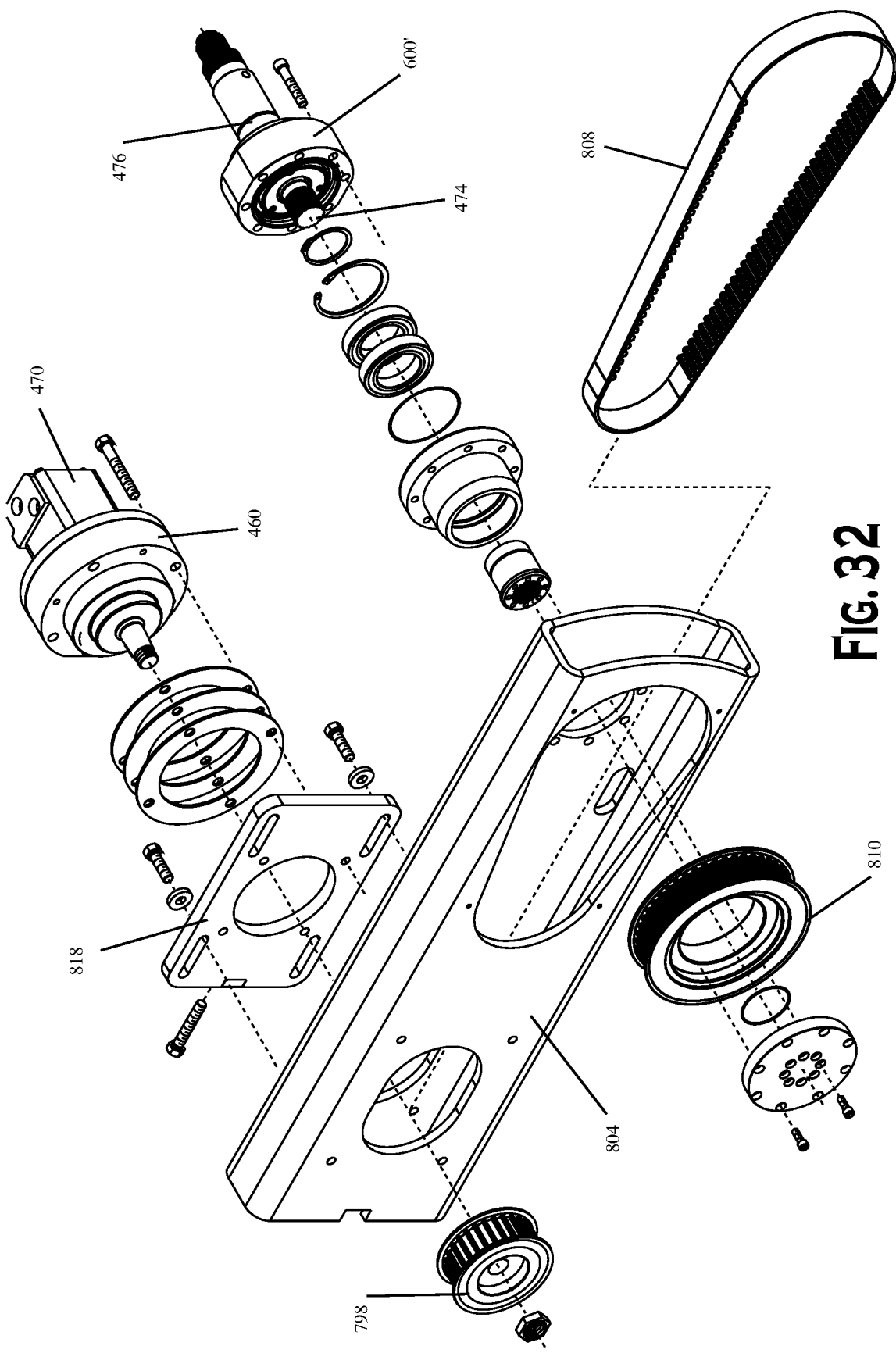
FIG. 32 is a partially exploded view of the driveline components of the selectively engageable drive system of FIG. 31.
Figure 33:
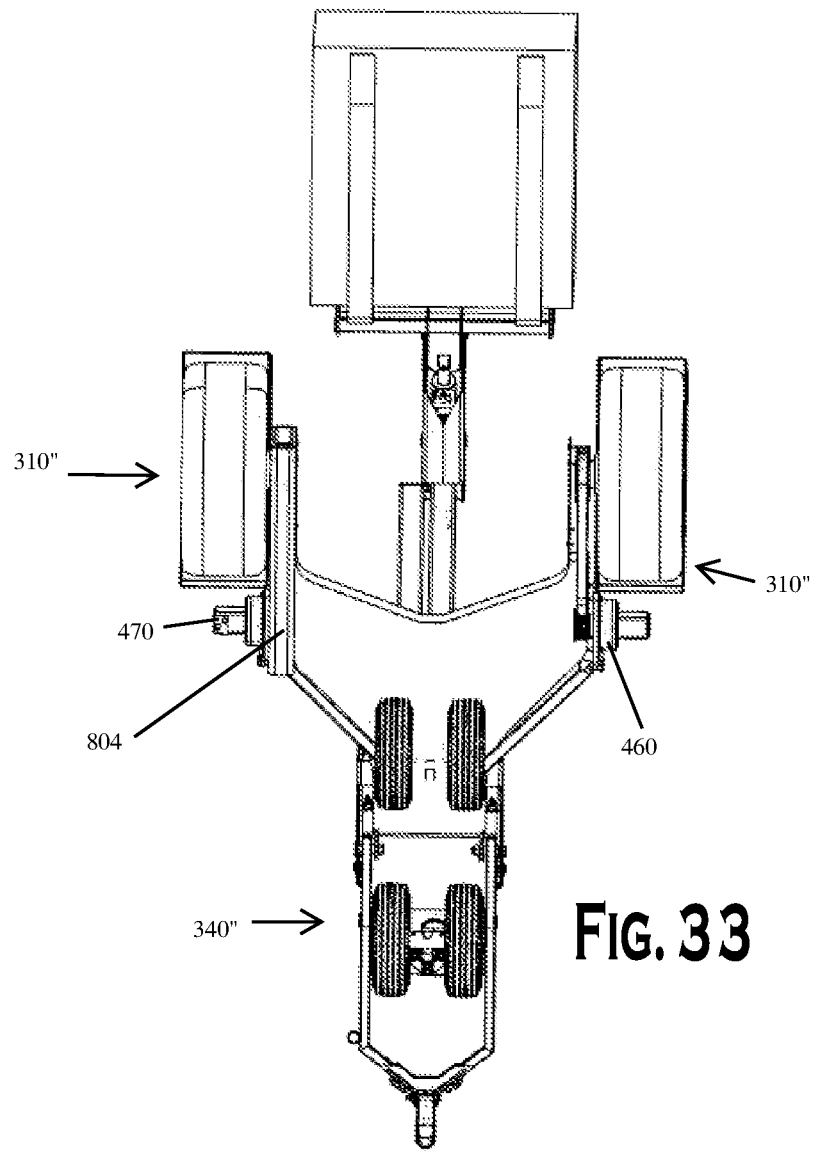
FIG. 33 is a bottom view of the embodiment of the self-propelled trailer of FIG. 27.
Figure 3:
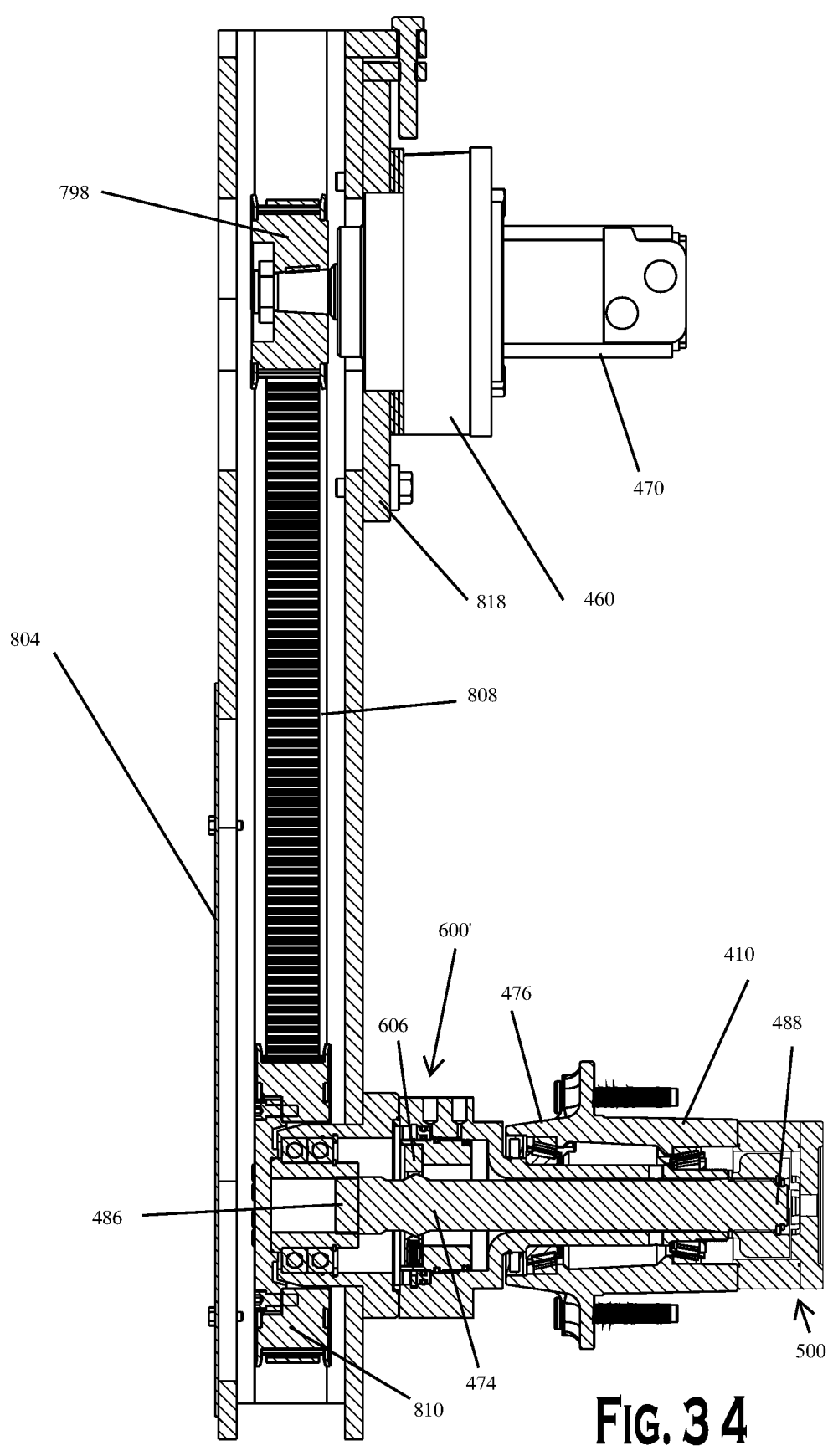

Further details regarding the driveline of the rear wheel assembly 310" can be seen with reference to the partial cross-section view of FIG. 34, and the exploded part view of FIG. 32. As depicted, the driveline is powered by a motor 470 that drives a motor pulley 798. The rotation force from the motor driveshaft may optionally pass through a transmission 460, such as a planetary gearset, or other arrangement as will be familiar to those of skill in the art for varying the input torque and the output torque, in order to adjust the rate of rotation and torque provided by the motor 470 as delivered to the rear wheels. The motor pulley 798 is affixed to, and therefore driven by the output shaft of either the motor 470 directly, or the transmission 460, if present, as shown. A belt 808 is passed around the motor pulley 798, and also around the power input pulley 810. The splines of the power input end 486 of the driveshaft 474 allow the driveshaft to be rotationally fixed to, and remain slidingly engaged with, the power input pulley 810. As previously described, the driveshaft 474 passes through the locking assembly 600' as shown, which is the hydraulically operated embodiment of the locking mechanism. The power output end 488 of the driveshaft 474 is fixed to the driven clutch component 502 of the clutch assembly 500. While the pressure actuated locking assembly 600' is depicted, it is contemplated that the manually operated locking assembly 600, relying on a handle or knob to control the locking assembly 600 may be provided as an alternative embodiment. Operation of the locking assembly, whether 600 or 600' is as previously described in order to urge the driveshaft 474 laterally to engage or disengage the clutch assembly 500, when the components 502, 504 allow the shifting of the driveshaft.

In an embodiment, the trailer 1" may be provided with a power source (not shown) such as a combustion engine to operate a fluid pump and provide hydraulic pressure, which may be selectively delivered to components, in order to power the motor 470, as well as to operate the lifting and extension mechanism 100. The lifting and extension mechanism 100 uses one or more actuators to raise and extend the lifting boom, and as shown, can adjust the angle of the head portion bearing the fork ends, such as can be used for moving loads, such as pallets, or other items as will be familiar to those of skill in the art. It is recognized that alternative lifting and extension mechanisms may be sub-stituted for the embodiment depicted, such that the trailer can be engaged in self-propelled movement and towed movement as previously described.

It is recognized that the teachings of the clutch assembly 500, and the locking mechanism 600, 600' may be employed in any variety of vehicles, and need not be limited only to the exemplary vehicles shown herein, where there is a need for allowing the controlled engagement and disengagement of the drivelines, using a locking assembly 600, 600', for one or more of the wheel assemblies, such as may be useful for transitioning the vehicle between a self-propelled mode, where a clutch would desirably be engaged to allow con-trolled movement of the vehicle, and a towed operation mode where a clutch would desirably be disengaged to allow safe towing of the vehicle, and the driveline would remain disengaged while being towed.

Figure 35:
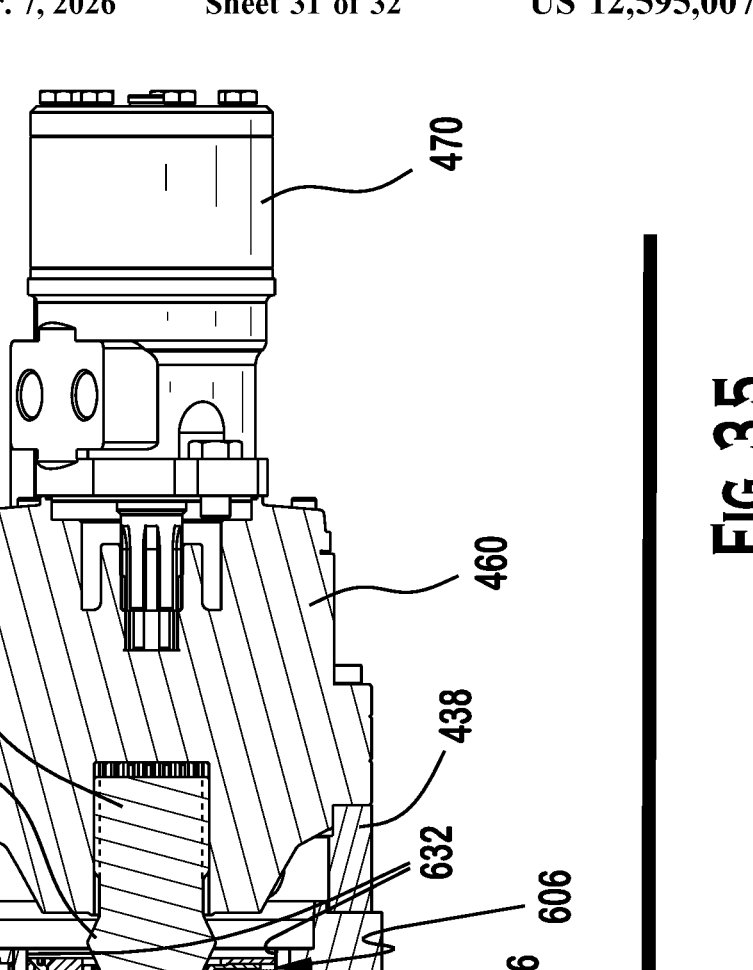
FIG. 35 depicts an embodiment of the embodiment of the selectively engageable drive system of FIG. 9, having been adapted to provide for selectively powering the movement of a conveyor belt mechanism.
Figure 36:
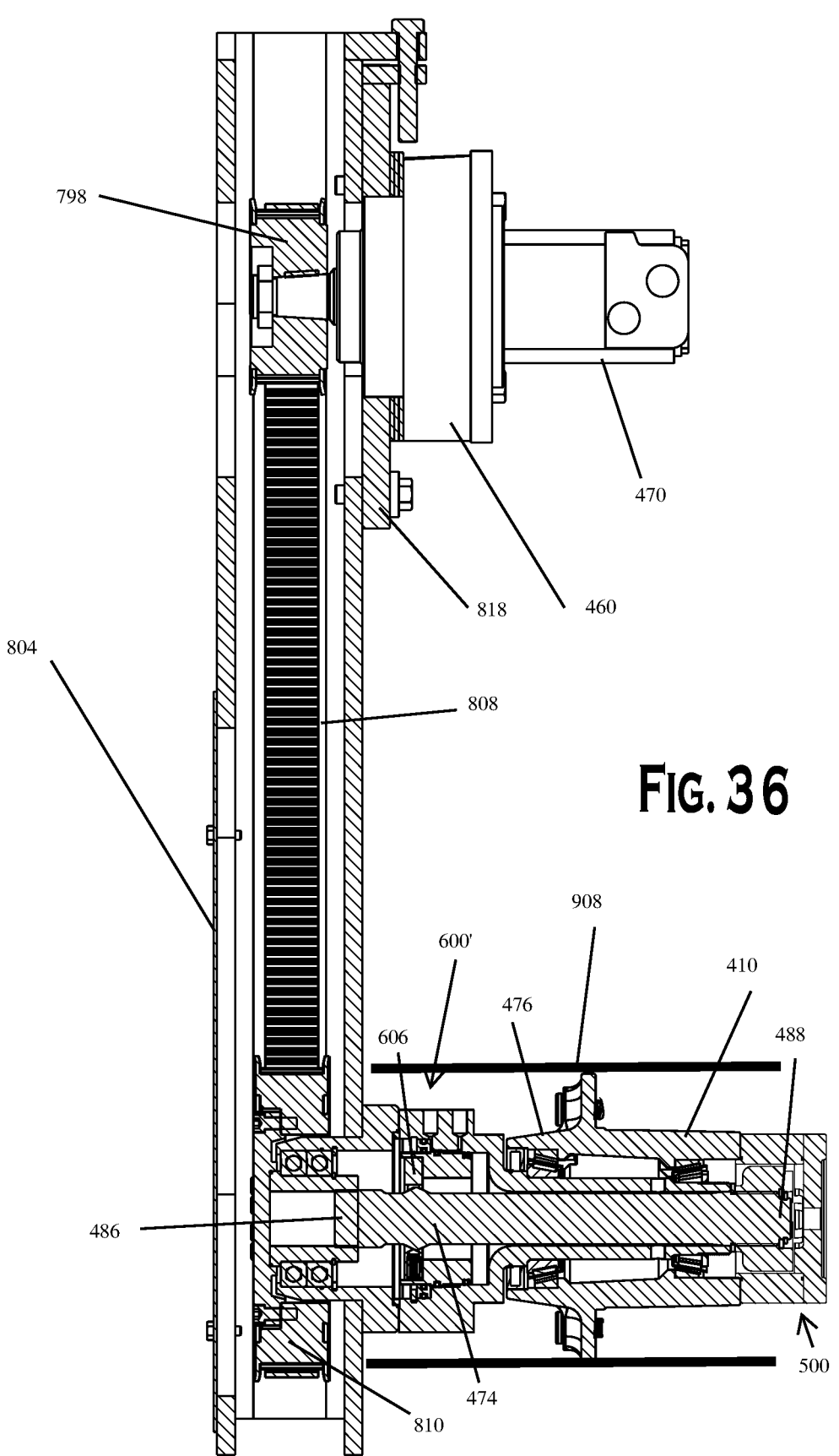
FIG. 36 depicts an embodiment of the embodiment of the selectively engageable drive system of FIG. 34, having been adapted to provide for selectively powering the movement of a conveyor belt mechanism.

It is further contemplated that the locking assembly embodiments described herein may be usefully deployed in any situation where there is a need to selectively engage or disengage a drive mechanism, subject to the clutch assembly or alternative force transfer mechanism being in a condition where the clutch assembly allows the urging force to become effective. Thus, the locking assembly embodiments taught herein, need not be limited to the previously described vehicular applications, but rather can be applied to any situation, or mechanical device where selective engagement of a drive assembly may be useful, subject to the conditions of the clutch assembly (e.g., the presence or absence of torque transmission through the clutch) for determining when the drive becomes fully engaged or disengaged. For example, a drive system having a locking assembly and clutch assembly, as taught herein may be deployed for selectively driving the operation of, for example, a conveyor belt system, especially an inclined conveyor belt system. In such an instance, and with reference to example embodi-ments in FIGS. 35 and 36, the locking assembly 600, 600' is provided similar to that previously described, only now provided in a selectively engageable drive system that is adapted to power a drive wheel or sprocket for a conveyor belt system, rather than powering a vehicle wheel as previ-ously described. As shown in FIGS. 35 and 36, a conveyor belt 908 may be wrapped around or in contact with the drive wheel and engaged by friction between the wheel and the inside surface of the belt, or as shown, the wheel hub may have a drive sprocket with teeth or sections that engage the inside surface of the conveyor belt 908 as will be familiar to those of skill in the art for powering and moving a conveyor belt. In such an instance, motive power from any suitable source may be applied to a power input end 486 of the driveshaft 474, which is in sliding engagement (in a direc-tion parallel to the longitudinal axis of the driveshaft) with, but is rotationally fixed with, the power input source. The power output end 488 of the driveshaft may rotationally, and slidingly fixed, to a driven clutch element, and the locking assembly 600 operated as described herein, in order to urge the driveshaft laterally for causing the clutch assembly to engage, or disengage, as appropriate. The clutch assembly may direct rotation force from the power source to a drive wheel for moving a conveyor belt assembly. As above, the urging force from the locking assembly would only become effective in disengaging the clutch assembly, when the clutch assembly is unloaded, and substantially no, or very little torque is applied through the clutch assembly 500. This is especially useful where the conveyor belt assembly is an inclined belt conveyor. As operation of the locking assembly 600 to urge the disengagement of the clutch assembly could only become effective when the conveyor belt is unloaded, the locking mechanism may serve as a safety mechanism, where it prevents disengagement until such a point as there is not any load on the inclined conveyor portion. If the clutch assembly was directly controlled, without the safety assur-ance provided by the locking assembly, and could become disengaged while still loaded, this may result in undesirable movement of the conveyor system due to a load remaining present on the inclined portion of the conveyor system and might allow free, uncontrolled movement of the conveyor belt, due to the force of gravity acting upon the load present on the inclined conveyor. Thus, the locking assembly 600 may provide a safeguard for ensuring safety when perform-ing maintenance on the conveyor system, by ensuring the conveyor is unloaded before the clutch disengages.

The foregoing illustrates some of the possibilities for practicing the invention. Many other embodiments and fields of use for the trailer 1 or 1' are possible and within the scope and spirit of the invention. It is, therefore, intended that the foregoing description be regarded as illustrative rather than limiting.

What is claimed is:

1. A selectively engageable drive system having a drive-shaft, a clutch assembly and a locking mechanism, the locking mechanism comprising:

a pushing member configured to reciprocate between a first position and second position within a housing;

an urging member in mechanical engagement with the pushing member, the urging member providing a collar with a plurality of radially oriented recesses, a plurality of plungers, and a plurality of biasing devices, with each recess of the plurality of recesses receiving one biasing device of the plurality of biasing devices, and one plunger of the plurality of plungers;

the plurality of plungers being oriented to be urged against a portion of the drive shaft that is configured to be shifted laterally in a first direction in an amount for effecting engagement of the clutch assembly, and shifted laterally in a second direction in an amount for effecting the disengagement of the clutch assembly, the drive shaft further having an annular protrusion pro-viding a first bearing surface and a second bearing surface positioned on either side of an apex of the protrusion.

2. The drive system of claim 1, where the lateral shifting of the drive shaft can be urged in the first direction by the positioning of the urging member such that the plurality of plungers are pressed against the first bearing surface of the pair of bearing surfaces, and the lateral shifting of the drive shaft can be urged in the second direction by the positioning of the urging member such that the plurality of plungers are pressed against the second bearing surface of the pair of bearing surfaces.

3. The drive system of claim 1, the clutch assembly providing a driving clutch element mechanically fixed to the driveshaft, and a driven clutch element mechanically fixed to a wheel hub, the engagement of the clutch assembly is provided for powering the rotation of a wheel through the drive assembly by moving the driving clutch element into rotational interference with the driven clutch element.

4. The drive system of claim 3, wherein the drive system further comprises a motive power source, and the drive shaft has a power input end that engages the motive power source through a connection allowing relative lateral movement, and an output end that is mechanically fixed to the driving clutch element.

5. The drive system of claim 4, wherein the power input end has a splined connection that allows lateral movement of the driveshaft relative to the motive power source, and where the power input end does not rotate independently of the motive power source mated to the splined connection.

6. The drive system of claim 4, wherein the driving clutch element and the driven clutch element each provide a plurality of teeth having engaging side surfaces, and each tooth of the plurality of teeth has planar engagement side surfaces.

7. The drive system of claim 6, wherein each tooth when viewed along a radial axis of the clutch assembly has a dovetail profile, characterized by the base of each tooth being of narrower dimension than the top plane extended between the upper edge of the side surfaces of each tooth.

8. The drive system of claim 3, wherein the urging of the drive shaft in the first direction by the urging member will not be effective in laterally shifting the driveshaft until such a point as the clutch assembly is capable of being engaged.

9. The drive system of claim 8, wherein the urging of the drive shaft in the second direction by the urging member will not be effective in laterally shifting the driveshaft until such a point as the clutch assembly is capable of being disengaged.

10. The drive system of claim 8, wherein the clutch assembly being capable of being engaged is a temporary status of the clutch assembly characterized by the teeth of the driving clutch element and driven clutch element being rotated into non-overlapping alignment, when viewed in an axial direction.

11. The drive system of claim 9, wherein the clutch assembly being capable of being disengaged is a temporary status of the clutch assembly characterized by there being an absence of torque being transmitted through the clutch assembly of the driveline.

12. The drive system of claim 1, wherein the reciprocating movement of the pushing member is caused by rotation of a spindle in mechanical engagement with the pushing member, the spindle having a pin mounted off center at the end of the spindle and extending into a slot of the pushing member.

13. The drive system of claim 1, wherein the reciprocating movement of the pushing member is directed by manipulating pressures in a first and second chamber alongside the pushing member, the pushing member having a medial seal that separates the first chamber from the second chamber.

14. The drive system of claim 13, wherein the reciprocating movement of the pushing member is hydraulically actuated, and the first chamber is in fluid communication with a first hydraulic port, and the second chamber is in fluid communication with a second hydraulic port.

15. The drive system of claim 14, wherein the locking mechanism further comprises a retainer provided to retain the pushing member and urging member within the housing.

16. The drive system of claim 1, wherein the plungers have a leading end with a friction reducing property.

17. The drive system of claim 5, wherein the source of motive power is a hydraulic motor, and a transmission is provided between the motor and the driveshaft, and the driveshaft is slidably extended between the transmission and the clutch assembly.

18. A self-propelled vehicle, comprising:

a frame forming an undercarriage chassis;

a wheel assembly positioned under the undercarriage chassis and comprising a hub assembly, a drive assembly including a hub, motor, a transmission, a selectively engageable clutch, a driveshaft with an annular protrusion providing a pair of bearing surfaces on either side of an apex of the protrusion, and a locking mechanism having a pushing member, an urging member with a plurality of plungers protruding inwards from the urging member and against the annular protrusion of the driveshaft, wherein the urging on the driveshaft is not effective until the clutch assembly allows the urging to become effective.

19. The self-propelled vehicle of claim 18, the urging member being mechanically secured to the pushing member, the urging member having a collar with a plurality of radially oriented recesses, each recess of the plurality of recesses receiving therein a biasing device and one plunger of the plurality of plungers.

20. The self-propelled vehicle of claim 19, wherein the plurality of plungers are pressed against a bearing surface of the pair of bearing surfaces to urge the driveshaft to shift laterally in a first direction.

\* \* \* \* \*